US012802372B2

(12) United States Patent
Raich et al.

(10) Patent No.: US 12,802,372 B2
(45) Date of Patent: Nov. 17, 2026

(54) AUGMENTED REALITY-ENHANCED BEAUTY MIRROR

(71) Applicant: Radichal LLC, New York, NY (US)

(72) Inventors: Jacqueline Raich, New York, NY (US); Bradley Augustine, New York, NY (US)

(73) Assignee: Radichal LLC, New York, NY (US)

( * ) Notice: Subject to any disclaimer, the term of this patent is extended or adjusted under 35 U.S.C. 154(b) by 0 days.

(21) Appl. No.: 19/441,581

(22) Filed: Jan. 6, 2026

(65) Prior Publication Data

US 2026/0196002 A1 Jul. 9, 2026

Related U.S. Application Data

(60) Provisional application No. 63/909,675, filed on Oct. 31, 2025, provisional application No. 63/742,822, filed on Jan. 7, 2025.

(51) Int. Cl.
*G06T 19/00* (2011.01)
*A45D 42/10* (2006.01)
(Continued)

(52) U.S. Cl.
CPC ............ *G06T 19/006* (2013.01); *A45D 42/10* (2013.01); *A45D 44/005* (2013.01);
(Continued)

(58) Field of Classification Search
None
See application file for complete search history.

(56) References Cited

U.S. PATENT DOCUMENTS

| | | | |
|---|---|---|---|
| 7,551,354 B2 | 6/2009 | Horsten et al. | |
| 9,598,018 B2 | 3/2017 | Lee et al. | |

(Continued)

FOREIGN PATENT DOCUMENTS

| | | |
|---|---|---|
| CN | 107198391 A | 9/2017 |
| CN | 111553220 A | 8/2020 |

(Continued)

OTHER PUBLICATIONS

Anderson, F. et al., “YouMove: enhancing movement training with an augmented reality mirror,” Acm Dl Digital Library [online], (Oct. 8, 2013). [Retrieved from the Internet on Dec 19, 2024 from URL: https://dl.acm.org/doi/10.1145/2501988.2502045]; PDF of Video Screenshot Provided, 32 pages.

(Continued)

*Primary Examiner* — James A Thompson
(74) *Attorney, Agent, or Firm* — COOLEY LLP

(57) ABSTRACT

An augmented reality-enhanced beauty mirror includes an enclosure having at least one mirrored surface, a processor, a display system operatively coupled to the processor, and a memory operatively coupled to the processor. The memory stores processor-readable instructions that, when executed by the processor, cause the processor to cause display, via the display system and at a first time, of an overlay such that the overlay is visible to a user concurrently with the user viewing a reflection of the user in the mirrored surface. At a second time subsequent to the first time, and in response to detecting a movement of the user, a position of the displayed overlay is modified.

28 Claims, 16 Drawing Sheets

(51) Int. Cl.

| | |
|---|---|
| ***A45D 44/00*** | (2006.01) |
| ***G02B 27/01*** | (2006.01) |
| ***G06F 3/01*** | (2006.01) |
| ***G06T 19/20*** | (2011.01) |
| ***G06V 40/16*** | (2022.01) |
| ***G09B 5/02*** | (2006.01) |

(52) U.S. Cl.
CPC ......... *G02B 27/0101* (2013.01); *G06F 3/012* (2013.01); *G06T 19/20* (2013.01); *G06V 40/161* (2022.01); *G09B 5/02* (2013.01); *G06T 2219/2004* (2013.01); *G06T 2219/2016* (2013.01)

(56) References Cited

U.S. PATENT DOCUMENTS

| | | | | |
|---|---|---|---|---|
| 10,546,429 | B2 | 1/2020 | Rhodes, Jr. et al. | |
| 10,762,799 | B1 | 9/2020 | Yang et al. | |
| 10,845,511 | B2 | 11/2020 | Cao et al. | |
| 11,068,051 | B2 | 7/2021 | Benford et al. | |
| 11,137,610 | B1 | 10/2021 | Kessler et al. | |
| 11,353,767 | B2 | 6/2022 | Lu et al. | |
| 11,464,319 | B2 | 10/2022 | Barron et al. | |
| 11,640,064 | B2 | 5/2023 | Kessler et al. | |
| 11,726,328 | B2 | 8/2023 | Zannoli et al. | |
| 11,803,059 | B2 | 10/2023 | Hua et al. | |
| 11,906,750 | B1 | 2/2024 | Trail | |
| 2014/0268355 | A1 | 9/2014 | Lee et al. | |
| 2016/0292917 | A1 | 10/2016 | Dorner et al. | |
| 2016/0357578 | A1 | 12/2016 | Kim et al. | |
| 2018/0144548 | A1* | 5/2018 | Kline | G06F 3/0304 |
| 2018/0330545 | A1 | 11/2018 | Jung et al. | |
| 2018/0373330 | A1* | 12/2018 | Benford | G06V 10/25 |
| 2019/0146128 | A1 | 5/2019 | Cao et al. | |
| 2019/0251749 | A1 | 8/2019 | Rhodes, Jr. et al. | |
| 2019/0371028 | A1* | 12/2019 | Harrises | G02B 27/0101 |
| 2020/0022478 | A1 | 1/2020 | Kelley et al. | |
| 2020/0301239 | A1 | 9/2020 | Akkaya et al. | |
| 2025/0261744 | A1* | 8/2025 | Aidan | G06V 20/20 |

FOREIGN PATENT DOCUMENTS

| | | | |
|---|---|---|---|
| CN | 112890403 | A | 6/2021 |
| CN | 115120077 | A | 9/2022 |
| CN | 115273167 | A | 11/2022 |
| EP | 3642692 | B1 | 10/2021 |
| KR | 102031512 | B1 | 10/2019 |
| WO | WO-2017108699 | A1 | 6/2017 |
| WO | WO-2022001882 | A1 | 1/2022 |
| WO | WO-2026151696 | A1 | 7/2026 |

OTHER PUBLICATIONS

Anderson, F. et al., “YouMove: Enhancing Movement Training with an Augmented Reality Mirror,” In UIST ’13: Proceedings of the 26th annual ACM symposium on user interface software and technology. Association for Computing Machinery (ACM), (Oct. 8, 2013), pp. 311-320.

Arsenova, A. “Smart Beauty Mirrors: AR & AI to Replace Makeup Testers,” Augmented Reality—BLOG, Banuba Software Company [online], (Jun. 9, 2020). [Retrieved from the Internet on Dec 18, 2024 at URL: https://www.banuba.com/blog/smart-beauty-mirrors-ar-and-ai-to-replace-makeup-testers]; 8 pages.

Banuba, “How Smart Makeup Mirror Technology Can Help You Stay Ahead of Competition in 2024,” Medium Corporation [online], (Jan. 4, 2024). [Retrieved from the Internet on Dec 8, 2024 from URL: https://banuba.medium.com/how-smart-makeup-mirror-technology-can-help-you-stay-ahead-of-competition-in-2024-d6b856eb374a]; 12 pages.

Liu, Y. et al., “3D-Mirrorcle: Bridging the Virtual and Real through Depth Alignment in AR Mirror Systems,” arXiv:2310.13617 [cs. HC], (Apr. 24, 2024); 10 pages.

MIRRAR—augmented reality tech platform, “Smarter Retailing: Replacing Makeup Testers with Artificial Intelligence Mirrors,” Mirrar.com [online], (Mar. 5, 2024). [Retrieved from the Internet on Dec 18, 2024 at URL: https://www.mirrar.com/blogs/smarter-retailing-replacing-makeup-testers-with-artificial-intelligence-mirrors]; 3 pages.

Scott, C. “Panasonic Smart Mirror Tells You What’s Wrong With Your Face, Then 3D Prints the Makeup to Fix It,” 3DPrint.com [online], (Oct. 13, 2016). [Retrieved from the Internet on Dec 18, 2024 at URL: https://3dprint.com/152407/panasonic-smart-mirror/]; 10 pages.

PCT Application No. PCT/US2026/010294, International Search Report and Written Opinion mailed Jun. 12, 2026, Applicant: Radichal LLC (dba Aurror), 21 pages.

PCT Application No. PCT/US2026/010294, Invitation to Pay Additional fees mailed Apr. 22, 2026, Applicant: Radichal LLC (dba Aurror), 13 pages.

* cited by examiner

1302

1342

1304

1338

1306

1308

AUGMENTED REALITY-ENHANCED BEAUTY MIRROR

CROSS-REFERENCE TO RELATED APPLICATIONS

This application claims priority to and the benefit of U.S. Provisional Patent Application No. 63/909,675, filed Oct. 31, 2025 and U.S. Provisional Patent Application No. 63/742,822, filed Jan. 7, 2025, the disclosure of each of which is hereby incorporated by reference herein in its entirety.

TECHNICAL FIELD

The present disclosure relates to augmented reality-enhanced mirrors, such as vanity or "beauty" mirrors.

BACKGROUND

In recent years, the beauty and wellness industries have developed technologies that engage consumers with brands, products, influencers, tutorials, or the like. For example, smartphones have supported social media platforms and web-based applications that provide consumers with makeup and/or skincare related content. Consumers, however, often have to sift through this overwhelming surplus of data to find content that is fit for their personal needs. Upon finding even quasi-relevant content, consumers then may find it difficult to replicate online tutorials, for example from a content creator having a different face shape, a different skin complexion, or different personal preferences. Moreover, content creators often teach in a manner that is tailored for mass audiences rather than for an individual consumer. Thus, a need exists for personalized, tailored instruction and guidance in the beauty and wellness industries to save the consumer time and money, and to achieve a desired result (e.g., a desired makeup look).

SUMMARY

In some embodiments, an apparatus includes an enclosure having at least one mirrored surface, a processor, a display system operatively coupled to the processor, and a memory operatively coupled to the processor and storing processor-readable instructions that, when executed by the processor, cause the processor to cause display, via the display system and at a first time, of an overlay such that the overlay is visible to a user concurrently with the user viewing their reflection in the mirrored surface. The memory also includes processor-readable instructions to, at a second time subsequent to the first time, and in response to detecting a movement of the user, cause a modification of a position of the displayed overlay.

In some embodiments, an apparatus comprises a display configured to emit light along an optical path, a first optical element disposed along the optical path and configured to modify the light, a second optical element configured to reflect the light emitted by the display at a non-zero angle relative to the optical path towards the mirror (e.g., towards the mirror such that the light is directed towards an eye(s) of the user) and a mirror including a first surface configured to face the user and a second surface facing the second optical element, the mirror configured to allow light redirected by the second optical element to transmit through the mirror such that a graphic appears overlaid on a reflection of the face of the user generated by the first surface of the mirror, the graphic associated with instructive guidance.

In some embodiments, an apparatus comprises an optical element configured to generate a reflection of a user, a processor, a display system operatively coupled to the processor, and a memory operatively coupled to the processor and storing processor-readable instructions that, when executed by the processor, cause the processor to: receive, from a user device (e.g., a mobile compute device of a user), data representing a user selection of a tutorial, and generate data associated with anatomical landmarks of a face of the user. The memory also stores processor-readable instructions that, when executed by the processor, cause the processor to align one or more tutorial graphic(s) associated with the tutorial with a representation of the face of the user based on the anatomical landmarks of the face of the user, and to cause display, via the display system, of the aligned tutorial graphic(s) such that the aligned tutorial graphic(s) appears overlaid on the reflection of the user generated by the optical element. The display of the aligned tutorial graphic(s) is optionally performed in coordination with (e.g., concurrently with, or overlapping in time with) tutorial-related content being displayed on the user device. At least one of the aligned tutorial graphic(s) or the tutorial-related content can include guidance for the user (e.g., instructions for applying makeup or other cosmetics).

DETAILED DESCRIPTION

Figure 1:
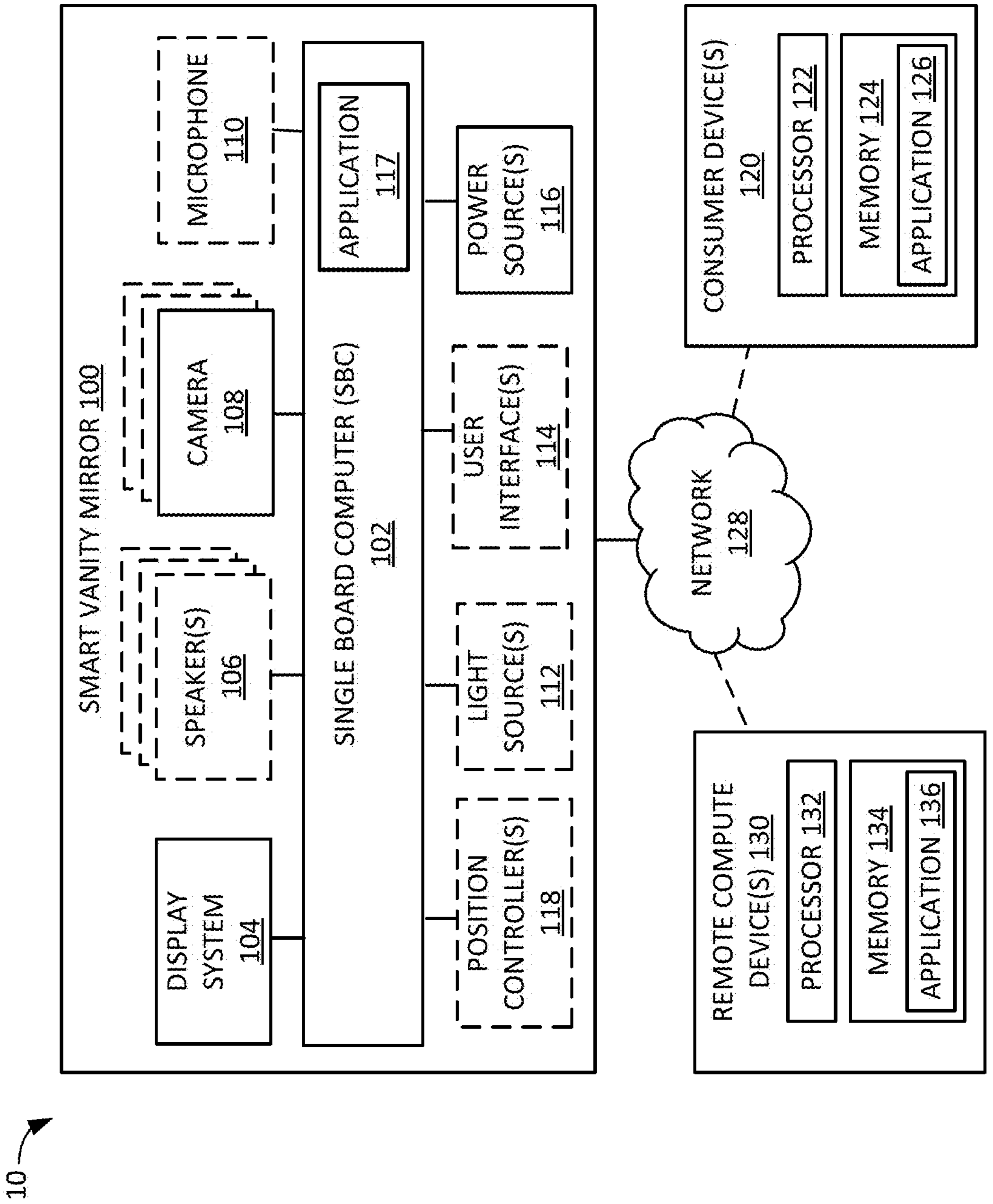
FIG. 1 is a block diagram of a system including a smart vanity mirror, in accordance with some embodiments.

In today's beauty industry, consumers are presented with an abundance of choices but can lack personalized guidance. Makeup application can be a frustrating and uncertain process for consumers, especially when they are trying new makeup "looks." Many consumers find it difficult to replicate online tutorials, for example because tutorials often don't account for individual differences in face shape or personal preferences of consumers. Without tailored/customized instruction, consumers waste time and products, and are uncertain whether the results are what they had envisioned or are flattering.

Some known approaches have implemented virtual try-ons (VTOs) to provide consumers with a way to virtually try on makeup products before purchasing those makeup products. Such VTO technologies capture an image or a video of a consumer's face via a camera on a consumer's smartphone (e.g., a selfie camera), tablet, laptop, or other compute device and display/replicate the captured image or video back to the user overlaid with the virtual makeup product (e.g., eyeshadow layer shown over the consumer's eyelid). The virtual makeup product can be shown using augmented reality (AR) layers that are displayed back to the consumer on top of the camera feed. VTOs may provide the consumer with a way to sample makeup products. The quality of the VTO, however, is often limited by the photo or video quality associated with the consumer's device. Moreover, issues can exist with alignment between the AR layers and the captured image or video.

Embodiments set forth herein overcome the foregoing limitations of known approaches, to provide personalized, visual guidance to consumers in the beauty marketplace. One or more embodiments set forth herein include a beauty tech product or beauty device (e.g., a smart vanity mirror) that transforms the makeup application process for consumers. For example, by integrating a mirror (e.g., a vanity mirror or other luxury mirror) with AR technology, virtual reality (VR) technology, artificial intelligence (AI) heads-up display (HUD) technology, and/or other display technologies, embodiments disclosed herein deliver a personalized, interactive experience that guides a user through a step-by-step makeup application process. For example, smart vanity mirrors disclosed herein, in accordance with some embodiments, can be configured to enable a user to view both their own reflection in the mirror as well as an AR masking layer(s) (e.g., solely the AR masking layer(s)), also referred to herein as overlay(s), that are aligned to or with the user's face (or a feature(s)/aspect(s) thereof) in the user's reflection and/or a representation of the user's face. As such, smart vanity mirrors disclosed herein, in accordance with some embodiments, can be referred to as AR smart mirrors. The smart vanity mirror disclosed herein can seamlessly integrate into vanity décor, bathroom décor, etc., to provide a sophisticated experience tailored to a user's unique features and preferences when powered on. Embodiments set forth herein can be desirable to tech-savvy, fashion-conscious audiences (e.g., makeup artists (MUAs)). In some embodiments set forth herein, VTO technologies are blended with video tutorials (e.g., YouTube® tutorials) into a seamless, interactive beauty experience. For example, the beauty device and/or the remote compute device can be configured to coordinate outputs of the beauty device (e.g., overlays, guidance, instructions, information, etc.) with outputs of the remote compute device (e.g., video tutorials). In some embodiments, the remote compute device and/or the beauty device can personalize the outputs based on anatomical landmarks of the face of the user. Embodiments set forth herein make professional-level makeup guidance accessible from, for example, a user's home. Further, embodiments set forth herein service consumer demand for personalization, efficiency, guidance, and engaging digital experiences.

Known AR mirrors are designed primarily for product try-on, with a focus on driving sales. For example, known AR mirrors are centered on commerce, thereby providing a transactional shopping experience. Further, known AR mirrors employ a standard VTO that focuses on what a final applied makeup look looks like on a user. Embodiments disclosed herein, by contrast, provide a beauty education platform. For example, one or more embodiments described herein provide personalized, step-by-step makeup tutorials using adaptive AR overlays. This can help users to apply makeup like professionals. The beauty device can be configured to overlay makeup application instructions over a representation of a user's face (e.g., their reflection). The overlay can be configured to adapt based on the reflection of the user so that as the user moves, the overlay remains aligned with an associated, related, or corresponding portion of the representation of the user's face. Embodiments disclosed herein can blend entertainment, learning, and social engagement. For example, embodiments disclosed herein can include a system that includes an application configured to be executed on a remote compute device (e.g., a consumer device) and operatively coupled to the beauty device (e.g., the smart mirror). The application can provide an interface for a user to browse looks, products, influencer materials and select or save tutorials and/or products. The application can be configured to display instructions (e.g., personalized instructions) in coordination with the beauty device. In some embodiments, the user can interact with the application of the consumer device to advance through steps displayed on the consumer device and the beauty device. Further, embodiments disclosed herein focus on the application process (e.g., makeup application process) to achieve a look (e.g., a makeup look). As used herein, a consumer device can refer to a mobile compute device such as a cell phone, tablet, laptop computer, and/or the like.

Known AR mirrors use a fully digital display with video streaming and AR masking layers, and are sometimes referred to as virtual mirrors. A cognitive dissonance or disassociation exists, however, when a camera feed exists above or aside the display. For example, the camera feed can represent a warped view of the depth, perception, and/or lighting compared to what is expected from an analog reflection. As such, the quality of the digital "reflection" of these known AR mirrors can suffer due to reliance on camera feeds and screen displays. Embodiments disclosed herein, by contrast, utilize a high-fidelity analog mirror (e.g., a non-virtual mirror) with an embedded display that shows AR overlays (e.g., only AR overlays) at a correct, desired, aligned, common and/or predefined depth of focus. The analog mirror included in disclosed embodiments has a higher perception of quality than a video feed on a display. As such, the analog mirror disclosed herein has better resolution, better responsiveness, better contrast, etc., than known AR mirrors. Embodiments disclosed herein also combine the clarity of an analog reflection (e.g., a real reflection) with precise AR guidance, ensuring an ultra-realistic and immersive user experience.

Known AR mirrors offer a solitary, product-focused experience driven by individual purchase decisions. Embodiments disclosed herein, by contrast, facilitate the construction of a beauty ecosystem in which users can create, share, and explore looks (e.g., makeup looks) as well as educate themselves on application techniques. Embodiments disclosed herein integrate one or more of user-generated content, influencer-driven tutorials, and/or a growing digital library for continuous learning and inspiration. Further, embodiments disclosed herein support a connected community, fostering interactions beyond individual product selection(s). For example, the application executed on the consumer device can enable interaction between users (e.g., saving content, liking content, following other users such as friends or influencers, etc.).

FIG. 1 is a block diagram of a system 10 including smart vanity mirror 100, in accordance with some embodiments. A "smart vanity mirror," as used herein, refers to an apparatus that includes an analog mirror 105 and an electronic display system 104 that is at least partially aligned with (e.g., disposed behind, from the point of view of a user) the analog mirror 105, such that the user can simultaneously view his/her own reflection and the imagery/video presented via the electronic display system during operation of the smart vanity mirror. Such imagery/video can be presented in alignment with the user's face (associated with the user's reflection). Further, the imagery/video is in dynamic alignment with the user's face such that the imagery/video moves, changes, and/or adapts as the user moves. An "analog mirror," as used herein, refers to a physical mirror such as a bathroom mirror, wall mirror, makeup compact mirror, vanity mirror, or the like, in which a user's reflected image appears (as opposed to a digital representation, such as a static or video image, of the user being displayed). A physical mirror can include a glass surface and a reflective coating to at least partially cover (e.g., fully cover) the glass surface. An analog mirror, as used herein, may include a magnifying mirror, a partially reflective dielectric mirror, or other reflective mirror structures suitable for use with overlaid display graphics. An "analog reflection," as used herein, refers to a mirror reflection (e.g., a mirrored reflection of a user's face, eyes, etc.) in an analog mirror, the mirror reflection being the optical effect of light rays bouncing off a reflective coating of the mirror and producing an image of the user that appears to be behind the mirror. In some embodiments, analog mirrors and/or smart vanity mirrors disclosed herein can be wall mounted, ceiling mounted, or can stand on their own (i.e., freestanding, such as on a table, countertop or desk). In some embodiments, analog mirrors and/or smart vanity mirrors disclosed herein can be used for makeup application, hair styling, skincare application, eyebrow and facial hair grooming, gua sha and facial massage/yoga, and/or the like.

The smart vanity mirror 100 includes a single board computer (SBC) 102 that controls, at least in part, the operation of various subcomponents of the smart vanity mirror 100 (e.g., via one or more software applications ("apps") 117, optionally incorporating AR and/or AI), and manages the flow of content to/from the smart vanity mirror 100. In some embodiments, the app 117 is software. In some embodiments, the app 117 is firmware incorporated/embedded into a frame of the smart vanity mirror 100. The SBC 102 can also include a memory, e.g., to store recipes, patterns, facial maps, makeup "looks," user data, device settings, device usage history, etc. As used herein, "recipes" can refer to sets of instructions and/or parameters associated with a particular goal/outcome. For example, a recipe to apply a desired makeup look can include makeup product information, color selections, makeup placement coordinates, sequences of makeup application steps, and/or the like. Recipes can also include details regarding modifications to a standard recipe that may be implemented in response to and/or based on a feature(s) of a user's face (e.g., a light or dark complexion, facial symmetry or asymmetry, eyebrow shape, size of eyes, spacing between eyes, lip shape(s), lip size(s), etc.). Although shown and described in FIG. 1 as including the SBC 102, in other embodiments the smart vanity mirror 100 can include one or multiple processors and one or more memories operably coupled to the one or multiple processors. The SBC 102 includes sufficient processing power and memory to operate the hardware components of the smart vanity mirror 100 and is configured to run one or more embedded AR software applications (e.g., app 117) (also referred to herein as "face AR" software, or a "face AR engine") with low or minimal latency. As such, the smart vanity mirror 100 is a functional hardware device incorporating a predefined face AR engine. In some implementations, the SBC 102 includes Wi-Fi® connectivity. The memory of the SBC 102 can store one or more of: a library of tutorials (e.g., makeup tutorials), user data (e.g., user face recognition data, anatomical landmarks of the user's face, user profile data, user preferences regarding mirror settings, user preferences regarding products, user preferences regarding makeup styles, etc.), product purchase history data, user tutorial viewing history, etc. Alternatively or in addition, the SBC 102 can be configured to retrieve/receive one or more tutorials (e.g., makeup tutorials), user data (e.g., user face recognition data, anatomical landmarks of the user's face, user profile data, user preferences regarding mirror settings, user preferences regarding products, user preferences regarding makeup styles, etc.), product purchase history data, and/or user tutorial viewing history via communication(s) from one or more remote compute devices (e.g., one or more servers in a cloud computing environment), such as the one or more remote compute devices 130 discussed below, via the network 128.

The smart vanity mirror 100 can include one or more of: a display system 104, one or more speaker(s) 106, one or more camera(s) 108, one or more microphones 110, a light source 112, a user interface ("UI") 114, a power source 116, or a position controller 118, each operably coupled to the SBC 102. The power source 116 can include an electrical connector and/or an electrical receptacle, facilitating electrical grid connectivity to power the smart vanity mirror 100. The electrical connector can be hard wired or can be removable. Alternatively or in addition, the power source 116 can include a rechargeable battery, such that the smart vanity mirror 100, when charged, can function without electrical grid connectivity. The smart vanity mirror 100 can include a reset button, optionally at least partially hidden on the device, for example to cease displaying one or more overlays. In some embodiments, the SBC 102, the microphone 110, and/or the speaker 106 are contained within, embedded in and/or positioned at a base of a frame (e.g., in the form of an enclosure, a bezel, surface, etc.) of the smart vanity mirror 100. In some implementations, the frame at least partially surrounds (e.g., substantially surrounds, fully surrounds, etc.) the smart vanity mirror 100. In some embodiments, the frame includes the light source 112 positioned therein or thereon. The light source 112 can include a light-emitting diode (LED) band positioned in the frame and surrounding the edge of the reflective portion of the smart vanity mirror 100. In some embodiments, the light source 112 borders or defines a boundary of the analog mirror 105. The light source 112 can be configured to emit light having a variety of different lighting color temperatures, including a single lighting color temperature or more than two different lighting color temperatures. The smart vanity mirror 100 includes an analog mirror 105 adjacent to, behind, above, under, or in front of the display system 104. The analog mirror 105 can be the same size as, larger than, or smaller than, a display area/screen of the display system 104. The analog mirror 105 of the smart vanity mirror 100 can include a dielectric mirror designed for smart mirror usage. The analog mirror 105 can be optimized/configured for desirable (e.g., approximately 60% reflectivity). In some embodiments, a desired reflectiveness/reflectivity of the analog mirror 105 is balanced and/or harmonized with a desired transparency of the overlay graphics from the display system 104. In some embodiments, the analog mirror 105 is concave to provide enhanced magnification. In some implementations, the analog mirror 105 is substantially circular in shape and has a diameter of approximately 15 inches (in). In other implementations, the analog mirror 105 is substantially circular in shape and has a diameter of between about 5 inches and about 20 inches, or between about 10 inches and about 20 inches, or between about 15 inches and about 20 inches, or greater than 20 inches. In still other implementations, the analog mirror 105 has a rectangular shape or an oval shape, with a first dimension of between about 5 inches and about 10 inches, and a second dimension orthogonal to the first dimension of between about 10 inches and about 20 inches (e.g., 7 inches by 15 inches).

In some implementations, the analog mirror 105 of the smart vanity mirror 100 is positioned adjacent to, and in front of, the display system 104. In other words, the back surface of the analog mirror 105 can be disposed between the front surface (user facing surface) and the display system 104. For example, the display system 104 may be positioned directly behind a structure that includes or includes only the analog mirror 105. Alternatively, in some implementations, the analog mirror 105 of the smart vanity mirror 100 is positioned next to (e.g., in a side-by-side configuration), and in front of, the display system 104. The analog mirror 105 may be physically in contact with the display system 104, with or without an intervening air gap or adhesive layer. The analog mirror 105 may be mechanically secured to the display system 104 such that there is no separation between the analog mirror 105 and the display system 104, such that a separation (e.g., non-zero distance) between the analog mirror 105 and the display system 104 is less than about 5 millimeters (mm), and/or such that a separation between the analog mirror 105 and the display system 104 is fixed, e.g., cannot be adjusted. In some implementations, there is no separation (i.e., the separation is 0 mm) between the analog mirror 105 and the display system 104 as a result of an optical bonding process, using an adhesive, being used to bond the analog mirror 105 directly and continuously to a surface of the display system 104. In such implementations, there is no air gap between the analog mirror 105 and the display system 104. In other implementations, a small or minimal separation may exist between the analog mirror 105 and the display system 104 as a result, for example, due to each of the analog mirror 105 and the display system 104 being independently mechanically coupled, fastened, or otherwise assembled to an outer support frame such that there is a fixed standoff distance/separation between the analog mirror 105 and the display system 104.

The SBC 102 can manage the flow of content to/from a consumer device 120 (e.g., a smartphone, cell phone, tablet, or other mobile compute device) and/or to one or more remote compute devices 130. The consumer device 120 includes a processor 122 and a memory 124 operably coupled to the processor 122. The memory 124 stores an instance of a software application ("app") 126 including instructions, algorithm(s), code, etc. The remote compute device(s) 130 includes a processor 132 and a memory 134 operably coupled to the processor 132. The memory 134 can store an instance of an app 136 including instructions, algorithm(s), code, etc. The processor 122 and/or the processor 132 can be operatively coupled to the SBC 102 via a network 128 such that the app 126 and/or the app 136 (optionally in combination with app 117) can control the smart vanity mirror 100. The network 128 can be a fully wireless telecommunications network, a fully wired telecommunications network, or a combination of both. The consumer device 120 and/or the remote compute device(s) can be or include a desktop computer, laptop computer, tablet and/or smartphone.

The app 117, the app 126 and/or the app 136 can control the display system 104, the speaker 106, the camera 108, the microphone 110, the light source 112, the UI 114, the power source 116, and the position controller 118. The app 117, the app 126 and/or the app 136 can cause display of an overlay(s) (e.g., an overlay graphic and/or text) via the smart vanity mirror 100. The overlay(s) are aligned to the features of a user such that the overlay(s) is visible to a user concurrently (e.g., concurrently or overlapping in time) with the user viewing their reflection (e.g., an analog reflection) in a mirrored/reflective surface of the smart vanity mirror 100. In some embodiments, the app 117, the app 126 and/or the app 136 causes the display of the overlay(s) via the display system 104. In some embodiments, the display system 104 includes a projector or other projection technologies, a liquid crystal display (LCD) screen, or the like. For example, the display system 104 may include the LCD screen at least partially within a frame or enclosure (housing) of the smart vanity mirror 100. The LCD screen can be positioned behind the analog mirror 105 of the smart vanity mirror 100. Put differently, the analog mirror 105 can be backed by (e.g., positioned in front of) a similarly sized and shaped LCD display screen. As such, the analog mirror 105 can be positioned between the user and the LCD display screen. The LCD display screen can be sufficiently bright (e.g., greater than 500 candelas of light per square meter (nit)) such that images displayed on the screen transmit or shine through the analog mirror 105 and are visible to the user. The display system 104 can include at least one of the LCD screen, a light-emitting diode (LED), an organic LED (OLED), a quantum dot LED (QLED), an active matrix organic LED (AMOLED), a mini-LED, or a micro-LED. In some embodiments, the at least one of the LCD screen, the LED, the OLED, the QLED, the active matrix organic LED (AMOLED), the mini-LED, or the micro-LED is disposed/positioned at least partially within the enclosure of the smart vanity mirror 100. In some embodiments, the display system 104 can include an autostereoscopic display having at least one of a light field display(s) (e.g., compressive light field display(s)), a volumetric display(s), a holographic display(s), a spatial multiplex display(s), a lenticular lens display(s), or a parallax barrier display(s). In some embodiments, the at least one of the light field display(s), the volumetric display(s), the holographic display(s), the spatial multiplex display(s), the lenticular lens display(s), or the parallax barrier display(s) is disposed/positioned at least partially within the enclosure of the smart vanity mirror 100.

Figure 5:
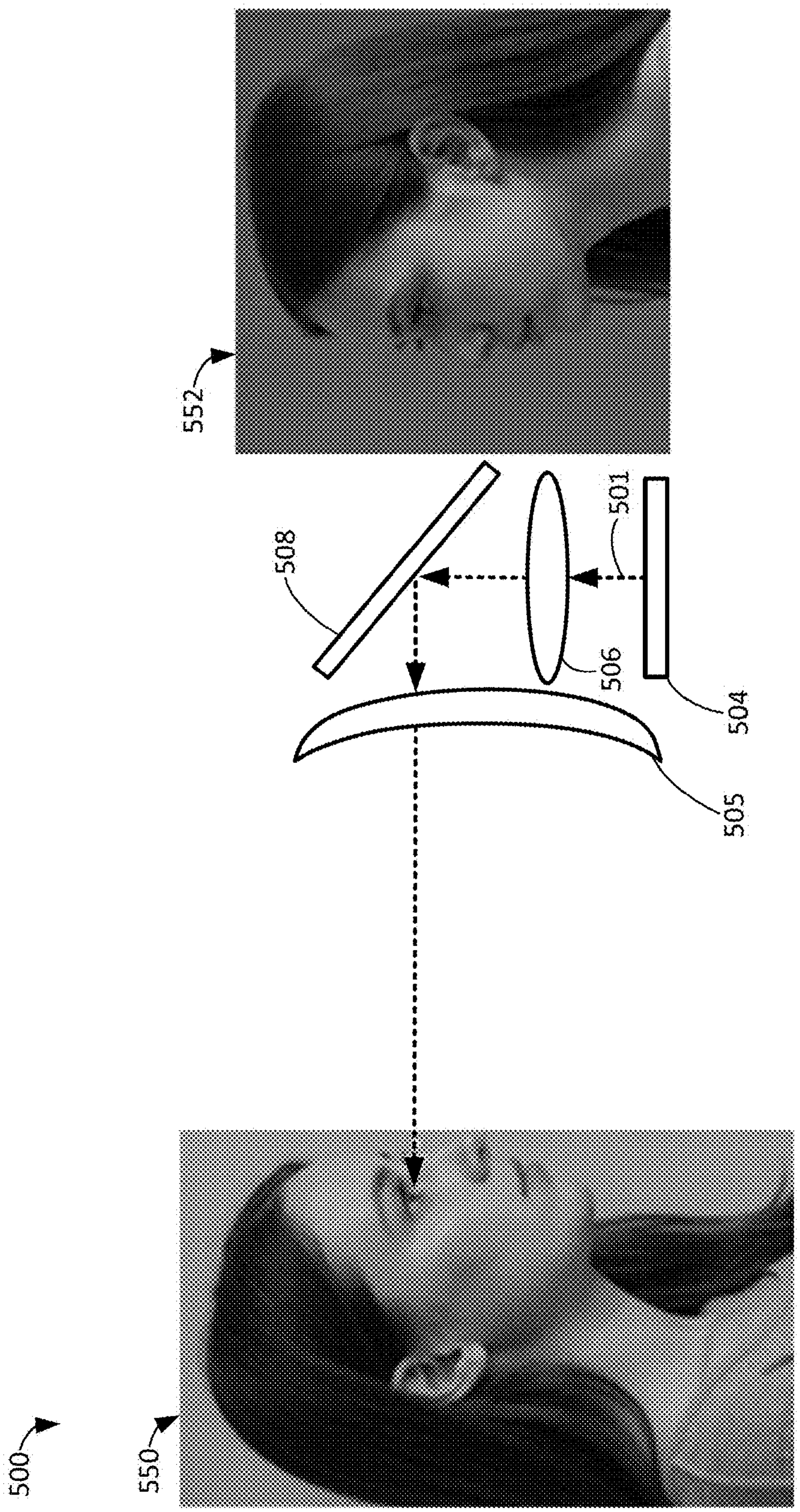
FIG. 5 depicts an optical diagram of a display of a smart mirror configured to display overlay graphics to a user, in accordance with some embodiments.

In some embodiments, the display system 104 alternatively or in addition includes a heads-up display (HUD) and/or a display system similar to an HUD as described in FIG. 5. For example, in some embodiments, the display system 104 includes a HUD system that uses AR technology to project images directly into the user's line of sight. In other embodiments, the display system 104 includes a HUD system that uses AR technology to project images to a focal point of the user's reflection. In some embodiments, the display system 104 may be configured to present or display one or more interactive objects via the UI 114, e.g., to facilitate control of the smart vanity mirror 100 and/or the app 126. The display system 104/UI 114 may incorporate touch screen capability and/or gesture detection/control to facilitate user interaction throughout the makeup application, e.g., such that that user can navigate through the tutorial steps (e.g., via touch gestures on the smart vanity mirror 100 or gesture detection via the camera 108). The UI 114 can improve a user experience (UX) with the smart vanity mirror 100. As such, the UI 114 may be referred to as a UX interface. In some implementations, the user can use the UI 114 to turn the power of the smart vanity mirror 100 on or off, make lighting adjustments, control volume, etc.

In some implementations, the app 117, the app 126 and/or the app 136 includes or has access to a catalog or library of makeup designs or application strategies (e.g., templates each having a predefined set of facial regions, shapes, colors, textures, and/or the like), also referred to herein as makeup "looks." Each makeup design can have one or more associated tutorials each configured to provide overlay graphics (e.g., static graphics, dynamic AR graphics, etc.) in alignment with the face of the user (or a feature/portion thereof), text and/or audio prompts, to guide the user through the makeup application process (e.g., to completion). In some implementations, the app 117, app 126 and/or the app 136 is configured to track/monitor a progress of the user's application process (e.g., a degree of completeness) within a particular tutorial, for each region from a plurality of facial regions of the tutorial, and may advance the tutorial from a first step to a second step (or from a second step to a third step, etc.) in response to detecting that the first step of the tutorial has been completed. For example, the camera 108 can record the user to determine whether a detection event (e.g., a movement, a series of movements, a gesture, etc.) has occurred and, in turn, the app 117, the app 126 and/or the app 136 can receive an indication that the detection event has occurred. In some examples, a detection event includes the completion or execution of at least one of the steps of the makeup tutorial. Alternatively or in addition, the app 117, the app 126 and/or the app 136 may prolong a time period associated with one or more steps of the tutorial, may skip steps of the tutorial, or may add steps to the tutorial in response to detecting the degree of completeness of the user's application process and/or based on customization from the user's preferences. Alternatively or in addition, the app 117, the app 126 and/or the app 136 may be configured to detect and/or generate a score for a quality of the user's application progress, and in response, modify one or more steps of the tutorial, terminate/pause the tutorial (automatically or in response to the user accepting a suggestion to terminate or pause the tutorial), or suggest an altogether different tutorial. For example, the app 117, the app 126 and/or the app 136 can access a camera image/video recording of the user executing the makeup application and compares the camera recording to a model (e.g., a generated image or video recording) of a face (e.g., the user's face or a model face) with the applied makeup look. The user of the smart vanity mirror 100 can view, scroll and/or otherwise navigate the catalog or library via the consumer device 120. Alternatively or in addition, in some embodiments, the app 117, the app 126 and/or the app 136 causes display of the catalog or library via the display system 104 such that the user can view and/or select makeup designs and/or tutorials via the UI 114. In some embodiments, the app 117, the app 126 and/or the app 136 can access/capture an image or video of the user's face (e.g., from the camera 108 actively detecting the user's face and/or a camera of the consumer device) as a representation of the user's face. In turn, the app 117, the app 126 and/or the app 136 can generate, select, or recommend a makeup application for the user. The app 117, the app 126 and/or the app 136 can modify the tutorial associated with the selected/recommended makeup application based on the face of the user (e.g., detected facial topology of the user). For example, the app 117, the app 126 and/or the app 136 creates shapes (e.g., brow shapes, contour shapes, etc.) that are customized to the specific face of the user. In some embodiments, the user can provide (e.g., input via a user interface) indications of one or more preferences for further customization of the makeup application process. For example, the user can provide representations of and/or preferences related to their facial features or other personal features such as facial piercings, product preferences, brand preferences, skin complexion, skin characteristics (e.g., acne), etc. The app 117, the app 126 and/or the app 136 can generate, modify and/or tailor a makeup application tutorial based on these preferences. In some embodiments, the app 117, the app 126, and/or the app 136 can receive a user preference, and the app 117, the app 126, and/or the app 136 can modify, add, or remove instructions based on the user preference. For example, if the user prefers to use little to no foundation in their makeup routine, the user can provide an indication of this preference to the app 117, the app 126 and/or the app 136. In turn, the app 117, app 126 and/or the app 136 can remove instructions or guidance related to the application of foundation, modify the tutorial such that a different product (e.g., powder, concealer, etc.) instead of foundation is utilized or is otherwise able to be substituted for the foundation, and/or recommend another tutorial that requires little to no foundation for the user to execute. In some implementations, the user can generate or otherwise piece together portions of makeup tutorials to generate their own tutorial. For example, the user can search and select, e.g., via the app 117, the app 126 and/or the app 136, a first portion (e.g., an eye shadow look) from a first makeup tutorial (e.g., from/associated with a first content creator), a second portion (e.g., lip look) from a second makeup tutorial (e.g., from the first content creator, from a second content creator, etc.), etc., to generate a combined tutorial. In some implementations, an AI model and/or the app 117, the app 126, and/or the app 136 can generate the combined tutorial in a similar manner based on user preferences, user face shape, user facial features, user complexion, detected user facial modifications (e.g., plastic surgery, piercings, tattoos, etc.), user experience level, etc.

The display system 104 can overlay graphics (e.g., AR graphics, text, etc.) that serve as instructional support and guide the user step-by-step through the selected makeup application/tutorial. In other words, the display system 104 can display a dynamic guided makeup application with overlaid graphics. The overlaid graphics can include step-by-step information such as step number, step descriptions, and application tool (e.g., brush, beauty blender, etc.). In some embodiments, the app 117, the app 126 and/or the app 136 generates overlay graphics based on a representation (e.g., a facial scan, still image, video imagery, etc.) of the face of the user. In some implementations, the generation of the overlay graphics is not based on, or does not take into account, a separation distance between the display system 104 and the analog mirror 105. The app 117, the app 126 and/or the app 136 can transmit the generated overlay graphics to the display system 104. The display system 104 can, in turn, provide these overlaid graphics to the user with precision placement and minimal latency. The smart vanity mirror 100 has the capability of displaying or projecting the overlaid graphics over the entire surface of the analog mirror 105, or over a subset thereof, via the display system 104. A user is, however, likely to find it most helpful when only a portion of the analog mirror 105 is overlaid by graphics/text, such that the user can see some portions of their face unobstructed (non-overlaid) and see the graphical overlay over some other portions of their face, at substantially the same time. In some implementations, the full area of the analog mirror 105 may be covered by/filled with graphics for a predefined period of time, e.g., when the smart vanity mirror 100 is powered on (e.g., initiation) or off.

In some embodiments, the overlaid graphics are aligned with or positioned adjacent to parts of the user's face. In some embodiments, the overlaid graphics can include outlines defining an area on the face, specific locations for makeup application, arrows indicating blending direction, etc. For example, the overlaid graphics can include a brow/crescent-type shape aligned with an eyebrow of the user on the user's reflection, or an eyelid/oval shape aligned with an eyelid of the user on the user's reflection. In some embodiments, the display system 104 can use HUD technology to display overlays directly on the analog mirror 105. In some implementations, the display system 104 can use focal plane imaging technology to display overlays, where the focal plane imaging technology uses facial tracking and/or gaze tracking to produce a single cohesive image at the user's focal points (e.g., eyes). For example, the smart vanity mirror 100 can be configured to detect a distance from and/or angle of the user to the analog mirror 105 and update or adapt a size and/or focal plane of the graphics displayed based on the distance or angle. The display system 104 can maintain alignment with the user's face (or a feature/portion thereof) as the user moves, gestures, makes facial expressions, etc.

The camera(s) 108 can be configured/positioned to face the user and to record and/or detect movement of a user (e.g., a face of the user) as the user performs its makeup application. In some embodiments, the camera 108 is configured or otherwise optimized for face tracking, face scanning, face mapping, vision tracking (e.g., using an infrared (IR) camera), distance measuring (e.g., via a light detection and ranging (LIDAR) camera), and usage with AR engines and AR environments. In some implementations, the camera 108 is a 3D camera. In some implementations, the camera 108 is an infrared (IR) camera. In some implementations, the camera 108 is positioned in the frame of the smart vanity mirror 100. Further, the display system 104 can continuously update and/or move the overlaid graphics based on the detected movement (e.g., user's facial movements). Accordingly, the overlaid graphics can adapt to the movement and remain in alignment with the facial positioning. For example, the display system 104 can modify a position of the displayed overlay in response to detecting a movement of the user while maintaining alignment with the face of the user, one or more of the user's facial features, etc. The camera 108 can include VTO tracking technology that tracks where the face is and where the overlaid graphics should align to the face. For example, VTO tracking technology can align the user's face (e.g., points or coordinates of the user's face) with a face of a model executing the tutorial on the app 117, the app 126 and/or the app 136 (e.g., as displayed on a screen of the consumer device 120). In some implementations, the position controller 118 can rotate, pan, or tilt the frame of the smart vanity mirror 100 based on detected movement associated with the user. In other implementations, the user can rotate, pan, or tilt the frame manually. The frame of the smart vanity mirror 100 can remain stationary while the display system 104 moves overlay graphics in alignment with user movements. Some users may find that graphics overlaid on their analog reflection and adapted to the location of their face is helpful, impactful, etc. For example, the app 117, the app 126 and/or the app 136 can transmit one or more visual cues as overlay graphics to the display system 104 that guide users when touch-up adjustments are needed or recommended. In some implementations, users may prefer to have an unobstructed view of their analog reflection as they apply makeup. As such, the display system 104 can adapt/modify the overlaid graphics/text based on/in response to the positioning of the user's face so that the user has better visibility of the user's reflection.

In some implementations, the overlaid graphics include one or more illuminated regions (e.g., warm, optionally pulsating lights) that indicate areas of focus with different animations and/or color highlights. Further, the overlaid graphics can include subtle, animated arrows (or movement) to guide blend direction and precise makeup application such as perfecting eyeliner. In some implementations, the overlaid graphics include highlight effects or directional cues to indicate areas (e.g., areas of the user's face) that may be in need of adjustment. In some implementations, the overlaid graphics include ethereal, luminous effects to create a "magic" feel during the makeup application process. The display system 104 provides the overlaid graphics in real-time to ensure the user always knows exactly how and where to apply makeup during the makeup application process.

In some implementations, the app 117, the app 126 and/or the app 136 can provide audio files to the smart vanity mirror 100 such that the smart vanity mirror 100 acts as a voice assistant. In turn, the speaker 106 can play the audio files to the user to provide verbal instructions or voice cues to assist in the overall instructional, step-by-step process. For example, the app 117, the app 126 and/or the app 136 can transmit an audio file to the speaker 106 that guides users when touch-up adjustments are needed or recommended. In some embodiments, the makeup application tutorials or other content may be narrated by a content creator and/or a makeup artist. In some embodiments, the voice cues may be an AI voice assistant that is customized to provide instructions or an experience that is tailored to an individual user. For example, the AI voice assistant can provide real time instructions to the user based on images/videos captured by the camera 108 while the user executes a makeup application. Further, the user can provide voice commands to the smart vanity mirror 100, via the microphone 110, to control or navigate the makeup application. As such, the app(s) (app 117, app 126 and/or app 136) and the smart vanity mirror 100 can provide a user with a "paint-by-numbers" experience, creating a smooth and seamless experience that feels both precise and enchanting/engaging. In some embodiments, the app(s) (app 117, app 126 and/or app 136) cause the display system 104 and the speaker 106 to facilitate an evaluation and feedback loop with the user regarding accuracy of a tutorial or an application step. In some embodiments, the app(s) (app 117, app 126 and/or app 136) cause the display system 104 and the speaker 106 to facilitate an evaluation and feedback loop with the user regarding a symmetry of their makeup application efforts (e.g., whether the makeup application to the left eye matches the makeup application to the right eye). In some such embodiments, the feedback can be generated based on images/videos of the user captured by the camera 108 as the user executes a single application step, multiple application steps, or the application steps collectively (e.g., for a given tutorial) as a whole. As such, the camera 108 and the app(s) (the app 117, the app 126, and/or the app 136) can visually inspect and evaluate how a task is being (or has been) performed. Further, the apps (the app 117, the app 126, and/or the app 136) can provide real time assessment(s) and/or feedback to the user such that the user dynamically experiences guided instruction (e.g., instead of just discrete, itemized steps). Thus, the smart vanity mirror 100 and the app(s) (app 117, app 126 and/or app 136) can define a personal beauty guide for the user.

In some implementations, the user uses the smart vanity mirror 100, during a first time period, only for the analog mirror 105 functionality (e.g., during a period of time when the light source 112 is deactivated or off, the camera 108 is deactivated or off, the display system 104 is deactivated or off, there is no AR functionality enabled, etc.). The user may then subsequently, during a second time period, use the smart vanity mirror 100 for the analog mirror 105 with the light source 112 turned on. In such implementations, the light source 112 can be adjusted by the user, as desired, in terms of temperature, brightness, activation, or deactivation. During such usage, the display system 104 may be deactivated or off such that no AR technology, VR technology, AI technology, etc. is being used. The user may then subsequently, during a third time period, use the smart vanity mirror 100 to its full capacity. For example, the user may use the app(s) (app 117, app 126 and/or app 136) and the smart vanity mirror 100 for a full makeup application AR experience during which makeup guidance is presented as a layer (e.g., AR overlay) over the user's reflection.

As previously mentioned, the app(s) (app 117, app 126 and/or app 136) can include a catalog or library of makeup applications having associated tutorials that provide graphics to guide the user through the makeup application process(es). These tutorials can be customized to fit a specific user. The app(s) (app 117, app 126 and/or app 136) can support the design and development of AR experience embedded or associated with hardware (e.g., the display system 104 of the smart vanity mirror 100). Further, the app(s) (app 117, app 126 and/or app 136) can host/serve as a marketplace for user-generated content, with an intuitive, engaging UI/UX. For example, the app(s) (app 117, app 126 and/or app 136) can include a curated marketplace for exploring, buying, and selling user-generated makeup looks. In some embodiments, the user can purchase makeup looks through an app store (e.g., Apple® App Store), a mobile software application, a website, or any other online marketplace, and subsequently, upload/pair the purchased makeup looks to the smart vanity mirror 100 for display and guided instruction. In some implementations, the marketplace includes recommendations surfaced through an algorithm that learns user preferences over time. In some implementations, the app(s) (app 117, app 126 and/or app 136) can include a user library in which previously purchased makeup looks, previously used makeup looks, etc., may be stored/saved for repeated use. In some embodiments, the app(s) (app 117, app 126 and/or app 136) include or are configured to access (e.g., via a remote compute device) a wishlist, where a user can save makeup looks and/or products for reference later (e.g., in the future). When the user pairs a selected makeup look with the smart vanity mirror 100 (e.g., causes the tutorial associated with the selected makeup look to be transmitted to the display system 104 for use in a subsequent makeup application), the user can choose to access the entire tutorial (e.g., to achieve the full makeup look) or to access a portion of the tutorial (e.g., to achieve a partial makeup look, such as just the eyes or lips). As previously mentioned, any of the tutorials described herein can be modified and/or customized based on preferences of the user. In some implementations, the user can request modification (e.g., AI modification) of the tutorials.

In some implementations, a makeup tutorial marketplace is hosted by and/or accessible via the app(s) (app 117, app 126 and/or app 136), and can include one or more free makeup looks, one or more pay-per-look options, and/or a subscription access option, e.g., for exclusive content. The app(s) (app 117, app 126 and/or app 136) can be supported by a robust back-end for e-commerce and secure payment integration. The e-commerce functionality can be configured (e.g., optimized) for importing, browsing and filtering of the various makeup looks, associated makeup products, etc. For example, filters associated with the marketplace include MUA, brand name, content creator, difficulty, rating, cost, user rating, and feature emphasis. In some embodiments, a single filter option can include MUA, brand name, and content creator. For example, a MUA can be a content creator hired by a brand to generate makeup looks, generate tutorials to execute a makeup look, etc. In some embodiments, an AI model can generate filters to sort/search through the marketplace. The app(s) (app 117, app 126 and/or app 136) can leverage sponsored posts, banner ads, and/or other paid placements within the marketplace.

In some implementations, the app(s) (app 117, app 126 and/or app 136) support or host look detail pages (LDPs). The LDPs can include hero images (e.g., large, attention-grabbing images optionally with text), highlights/look attribution (e.g., full glam), etc. For example, the LDPs can include look attributions that include a classification of defining features of the makeup looks, such as "cat-eye," "everyday makeup," "full coverage," or the like. Further, the LDPs can include highlights that indicate/emphasize key attribution features or other high-level descriptors of a makeup look to the customer (e.g., as a snap shot). In some implementations, the LDPs provide an alternate image that displays a VTO of the user/customer wearing the makeup look. The user can decide whether or not to purchase the makeup look based on the VTO provided by a LDP. The LDPs may also include user ratings, reviews, and/or other images/videos of the makeup look.

Unlike some known makeup-related marketplaces, which are offered via digital-only affiliate networks, the app(s) (app 117, app 126 and/or app 136) described herein, in accordance with some implementations, tie affiliate networks to physical hardware (e.g., the smart vanity mirror 100) in users' homes, such that the makeup tutorials set forth herein can be integrated directly into the users' at-home beauty routines. The LDPs can provide affiliate links for makeup products that may be used to complete the selected makeup look and/or the VTO. Makeup brands stand to profit from increased traffic on their websites. So, LDPs disclosed herein can provide affiliate links that can increase a number of users that visit a brand website or other third party website to peruse or purchase affiliated products, helping brands profit. LDPs can further include recommendation tabs or carousels that provide additional categories of makeup looks. Such categories can include "You may also like" (e.g., recommended makeup looks based on previously viewed makeup looks) and "Similar looks" (e.g., makeup looks similar to the makeup look the user is currently assessing). Another example category includes "Based on your makeup bag." The app(s) (app 117, app 126 and/or app 136) can recommend or list makeup looks that can be accomplished based on products the user already owns, products in a shopping cart of the user, products in a wishlist of the user, etc. In some implementations, the user can take photos of the products that it currently uses (e.g., via the camera 108). Then, the app(s) (app 117, app 126 and/or app 136) identifies the product and adds/uploads the product to a virtual makeup bag associated with the user (e.g., a database of products stored in the app(s)). In some implementations, the app(s) (app 117, app 126 and/or app 136) can recommend or list makeup looks that can be accomplished based on products similar to products or items uploaded to the virtual makeup bag. In this manner, the app(s) (app 117, app 126 and/or app 136) can perform makeup bag integration to the recommendation algorithm.

In some implementations, when a user makes a purchase via the marketplace (a "purchase event"), the purchase event can trigger one or more dynamic updates to be made (e.g., automatically, without further user intervention) to an AR session(s) of the user. For example, a tutorial(s) associated with the purchased product may be automatically preloaded or loaded, one or more overlays may be re-mapped/reconfigured for the purchase product's application zones, and/or one or more complementary looks may be suggested based on the user's owned items and facial geometry.

In some implementations, the app(s) (app 117, app 126 and/or app 136) include user profiles. For example, the user of the app(s) and/or the smart vanity mirror 100 can create or access a user profile. In some implementations, the app(s) provide a personalized beauty quiz, interactive chatbot, etc., to facilitate creation of a user profile (e.g., at setup to seed or initiate the initial algorithm of the user profile). Further, MUAs can create their own user profiles. The app(s) can include a back-end portal for MUAs, influencers, and brands to manage their own profiles, track their analytics, and access affiliate performance. In some implementations, MUAs, influencers, and brands can purchase access to analysis of their data (e.g., users visiting brand profiles, users accessing makeup looks via brand profiles, affiliate performance metrics, etc.). The data may be randomized data. Users can interact with the app(s) to search for and/or view other user profiles, MUA profiles, influencer profiles, or brand profiles.

The app(s) can provide personalized makeup guidance (e.g., personalized makeup looks) based on the user's unique features and face. For example, the app(s) can be communicatively coupled to the camera 108 such that the app(s) can access images and/or videos of the user's face. The camera 108 can use face scanning technology to capture images and/or videos of the user's face. In some implementations, the app(s) identify coordinates or points on the face that are associated with or that correspond to features (e.g., check bones, nose, eyes, lips, forehead, chin, etc.) of the user. As such, the app(s) can map key points on the user's face associated with features. In some implementations, the app(s) can be communicatively coupled to an external software that provides such facial mapping of the user. In some implementations, the app(s) map points from a MUA's look onto the user's face for personalized makeup guidance such that the points from the MUA's look aligns with the key points of the user's face. In some implementations, the app(s) can be communicatively coupled to an external face AR software to provide such mapping from a MUA's look. In some implementations, user data (e.g., the coordinates associated with the user's features) is used for personal recommendations. In some implementations, the user uses the camera 108 to capture photos and/or videos of themselves as they execute the makeup look. Further, the user can upload the captured photos and/or videos to its user profile, its smartphone, and/or share to its social media account(s). Alternatively or in addition, MUAs, content creators, and/or brands can upload the photos and/or videos to their respective or each other's user profiles, their respective smartphones, or social media account(s). Further, MUAs, content creators, and/or brands can share content (e.g., makeup looks, product recommendations, etc.) with and between one another.

In some implementations, the app(s) support a MUA and/or Brand Portal having automated functionality to break down a makeup look into itemized application steps. The app(s) can provide a workspace or other UI for a MUA to edit each of the itemized application steps. In some implementations, the MUA can view and edit the AR graphics (e.g., prior to transmission to the display system 104) relating to the individual application steps. The makeup tutorials provided and/or generated by the MUA may be subject to a verification process, review of content, or a back-end approval workflow before a user/customer can access the makeup tutorial. Similarly, any edits to the AR graphics made by the MUA may be subject to a verification process, review of content, or a back-end approval workflow (e.g., before the user has access to the AR graphics). As such, any new content can be reviewed prior to uploading to the marketplace and prior to user access of the new content. In some implementations, verified content creators, verified brands, and/or verified MUAs may have an associated a check mark upon completion of the verification process.

In some implementations, the camera 108 and AI/machine learning models can facilitate the break down/deconstruction of a makeup look into the itemized steps. For example, the AI model categorizes sections, parts, etc., of the makeup tutorial and modifies, updates, or enhances the tutorial based on the categories (e.g., priming, foundation, eyes, lips, etc.). The AI model can modify the tutorial by adding helpful tips (e.g., with overlay graphics and/or audio), removing complicated and/or unnecessary steps, adding more time to the description of a step, etc. Alternatively or in addition, the AI model can modify the tutorial based on a face shape of the user. Modification of makeup tutorials by the AI model can be a passive setting or an active setting. As a passive setting, the AI model automatically modifies and/or updates makeup tutorials (e.g., based on user preferences, features, etc.). In such examples, the AI model can observe repeated behaviors of a user and modify subsequent tutorials based on the repeated behaviors. For example, if a user has opted to not use blue eyeshadow, the AI model can modify a subsequent makeup tutorial to remove or replace blue makeup (e.g., blue eyeshadow, blue lipstick, etc.). As an active setting, the user can activate or deactivate modification of the tutorial by the AI model. In other words, the user can turn AI modification services on/off as desired. In some implementations, an AI model is configured to categorize looks (e.g., differentiate a smoky eye from a cat eye). Further, the AI model can categorize product recommendations (product attribution). In some implementations, the AI model can identify/detect products, tools, etc., used in a makeup tutorial. For example, as the MUA demonstrates a step of applying mascara, the AI model can identify the brand, product, color, or any other identifying feature of the mascara and present this information to the user. Alternatively or in addition, the AI model may detect a product(s) and/or tool(s) being used by a user during an application process, and modify a tutorial, generate feedback, and/or generate recommendations based on the detected product(s) and/or tool(s).

In some implementations, an AI model can assess an execution of a selected makeup look by the user. In turn, the AI model can provide feedback (e.g., a feedback notification, real-time feedback, an audio file played on the speaker 106, an overlay graphic transmitted to the display system 104, etc.) on the user's makeup application. The AI model may modify the tutorial prior to, during, or after providing feedback on the execution of the makeup look. The feedback can include, by way of non-limiting example, a makeup application score, text-based feedback, audio feedback, graphical feedback, video feedback (e.g., a remedial makeup application video), etc., any of which can include guidance as to how the user can improve their makeup application. In some embodiments, the AI model can generate at least one of a feedback message or an overlay notification to provide feedback to the user. For example, an overlay notification can include graphical overlays (e.g., images, text, lighting, etc.) that indicate further instructions and/or guidance to help the user execute a makeup application or at least one step of a makeup application. Additionally or alternatively, the overlay notification can include graphical overlays that indicate criticism of the user execution of a makeup application. In some embodiments, the AI model can change, modify, and/or move such an overlay notification as the user executes the additional guidance. As such, the AI model can function as an AI "coach" that reacts to movements of the user.

In some implementations, the app(s) (app 117, app 126 and/or app 136) is configured to modify overlay graphics to accommodate or represent an occlusion event in which a reflected real-world object (e.g., the user or a portion thereof, an object being held by the user, etc.) at least partially overlaps with the overlay graphics, such that the overlapped region of the overlay graphics is not viewable by the user (such that the overlay graphics emulate real-world imagery/objects). The modification of the overlay graphics can, for example, be performed dynamically, in real-time or substantially in real-time. As an example, if a user is applying blush using the smart vanity mirror 100 and the user's hand is positioned in front of an AR graphic/overlay showing where to place the blush (e.g., the user's hand is positioned between the user's eyes and the AR graphic), it may be undesirable for the AR graphic to appear on the user's hand. A goal can include to have the AR graphic appear, in the mirror, like a tattoo on the user's face, and when the user's hand is in front of the user's face, the user's hand would cover/block the visibility of the tattoo.

In some implementations, the app(s) (app 117, app 126 and/or app 136) is configured to cause display of animation(s) and is not configured to stream video. In other implementations, the app(s) (app 117, app 126 and/or app 136) is configured to selectively cause display of animation(s) and to stream video. In still other implementations, the app(s) (app 117, app 126 and/or app 136) is configured to concurrently, or overlapping in time, cause display of animation(s) and to stream video. For example, the system 10 may be configured to play a video makeup tutorial in a portion of the display system 104, and display an overlay associated with the video makeup tutorial, so that the user can apply makeup using the overlay as a guide while observing/following along with the video makeup tutorial.

In some implementations, the app(s) (app 117, app 126 and/or app 136) is configured to trim, crop, resize or otherwise alter/modify an overlay, animation, and/or video before it is presented to a user via the smart vanity mirror 100, or dynamically in real-time or substantially in real-time as the overlay, animation, and/or video is presented to the user. The alternation/modification of the overlay, animation, and/or video may be performed automatically (without human triggering or intervention), for example in response to detecting one or more parameters of a user (e.g., the user getting closer to the analog mirror 105) which may be user-defined or otherwise predefined. Parameters that could trigger or cause alternation/modification of the animation and/or video may include, but are not limited to, a distance of the user from the system 10, a shape of the smart vanity mirror 100, a lighting condition of an environment in which the smart vanity mirror 100 is positioned, a degree of completion of a tutorial (e.g., once eyeliner has been fully applied by the user, the overlay, animation, and/or video may be cropped or otherwise modified to omit an eyeliner tutorial overlay portion), etc.

One or more smart vanity mirror implementations set forth herein facilitate the encoding, re-mapping and/or enhancement of a user's appearance via a live AR session that is personalized to that user. As used herein, "encoding" can refer to an initial imaging/mapping of a user's face (to generate a facial map for the user ("user face map")), "re-mapping" can refer to translating a predefined tutorial facial map (e.g., a template face map used to represent regions that are referenced as part of a tutorial) to the user face map, and "enhancement" can refer to modification/optimization of one or more animations to best suit an individual user's features. Tutorials presented to users via smart vanity mirrors of the present disclosure may be customized to each individual user, for example based on a three-dimensional (3D) camera mapping of each user's face, optionally as part of each AR session.

In one or more implementations, representations of one or more makeup compositions (or "looks") are stored in a memory (e.g., in memory 115, memory 134 and/or memory 124) for use during execution of the app(s) (app 117, app 126 and/or app 136). The one or more makeup compositions can be defined by, for example, a user (e.g., a consumer), a branded company (e.g., a makeup manufacturer or retailer), an entity that owns the system 10 (e.g., a salon owner, a spa owner, etc.), and/or an external content creator(s). The representations of the one or more makeup compositions can be stored with, and/or in manner that associates the one or more makeup compositions with, one or more associated face maps (e.g., a map of a face of the user or of a model). The face maps can be or include, for example, facial landmark maps. Alternatively or in addition, the representations of the one or more makeup compositions can be stored with, and/or in manner that associates the one or more makeup compositions with, guidance parameters. The guidance parameters can be or include, for example, manually defined guidance parameters (e.g., created by a designer drawing paths and/or specifying placement of makeup regions) or guidance parameters that are automatically generated by the system 10, for example using algorithmic derivation of contours, strokes, or regions from/based on the associated one or more makeup compositions. Alternatively or in addition to the foregoing, the guidance parameters can include one or more of: paths (e.g., eyeliner line, contour path), region (e.g., blush area, lip fill zone), trajectories of application (e.g., stroke direction or motion sequence), or opacity, pressure, and/or brush width (e.g., to represent how strong/bold or soft/subtle the application is to appear). In some implementations, a face map(s) may be stored using a UV face mesh to "map" the face (e.g., generate a 3D surface that conforms to facial landmarks) to align the virtual makeup accurately. For example, a foundation layer or contour path could be stored as texture data aligned to the creator's UV mesh, so the same coordinates can be applied to different faces based on their individual facial landmark mapping.

In some implementations, system-side translation and/or adaptation can be performed. For example, when a tutorial look is purchased (e.g., via an app) and paired with the smart vanity mirror, the system 10 can compute a mapping from the creator's (or model's) facial landmark set to the user's landmark set. The overlays can be re-parameterized to the user's face mesh. This can involve warping geometry, repositioning guides, scaling shapes, and aligning the overlays to the mirror's camera coordinate system so they remain anchored to the user's features in real time. The translation process may be handled through automated generation by Primer's system or through manual creation of overlay assets. Beyond one-to-one mapping, the system can apply adaptive enhancements. For example, if the user's cheek structure differs from the creator's, the guidance may be algorithmically altered to improve (or optimize) placement rather than directly copied. Similar adjustments can be made to eyeliner wing length, lip contour boundaries, or brow thickness to yield a more flattering result.

In some implementations, a smart vanity mirror system can facilitate product purchases, for example via in-app purchases and/or via an AR-specific purchase mechanism(s). Each product purchase can be logged to a user's profile and added to a digital "makeup bag." These signals can be fed into the recommendation and personalization logic for future tutorials. The system 10 learns from owned and purchased items to prioritize looks and suggest creators or steps that fit the user.

In some implementations, a smart vanity mirror system 10 can track multiple facial features (e.g., landmarks) independently, including for distinct facial zones/subregions (e.g., left eye, right eye, left eyebrow, right eyebrow, left cheek, right cheek, lips, etc.), optionally in real time or substantially in real time. Alternatively or in addition, in some implementations, a system 10 can track and dynamically update multiple overlays, each such overlay being associated with one or more distinct facial zones (e.g., left eye, right cheek), optionally in real time or substantially in real time. The tracking of multiple facial features and/or the tracking and updating of multiple overlays can be performed in a manner such that an alignment of the multiple facial features with the multiple overlays is substantially maintained (e.g., frame-to-frame).

In some implementations, a smart vanity mirror system 10 is configured to guide users through a structured, multi-step tutorial. In some implementations thereof, during display of the tutorial, only an overlay(s) relevant to a current step at any given time/step is displayed, and advancement through the tutorial (e.g. from one step to the next) can be in response to/based on user interaction(s) with the system 10. For example, advancing of a tutorial from a first step to a second step may occur in response to one or more "gating" conditions being satisfied (e.g., detecting that a user has successfully or adequately completed the first step, as determined based on an image of at least a portion of the user's face).

In some implementations, user performance is evaluated during each step (e.g., using CV to evaluate actual makeup application and comparing that to a target) and altering system behavior accordingly, by pausing progression, adjusting overlays and/or delivering visible feedback. The user performance can be based on a detected makeup application accuracy.

In some implementations, the operation of a smart vanity mirror system 10 includes the use of a feedback loop for evaluating a user's actual makeup application relative to the AR guidance. Evaluated parameters can include placement accuracy as well as derived quality measures such as symmetry and stroke thickness. Deviations can be detected in a "paint-by-numbers" fashion, where the system 10 can determine if/whether the user has drawn or placed makeup outside the intended region.

Feedback can be delivered, for example, in real time (or substantially in real time) and/or multimodally (e.g., visual overlays or highlights, verbal cues from the voice assistant, or other corrective prompts). In some implementations, feedback data may be logged to the user's profile to track improvement over time, identify recurring mistakes, and personalize future tutorials.

In some implementations, the operation of a smart vanity mirror system 10 includes the suggestion for, or implementation/triggering of, corrective actions. Such corrective actions can range from alerts (e.g., audio, visual, light-mediated, etc.) to adaptive tutorial adjustments such as pausing, repeating a step, slowing the cadence, modifying overlays to suggest an alternative technique, or indicating removal of applied makeup.

In some implementations, an evaluation process includes system 10 using a camera feed of camera 108 of smart vanity mirror 100 to capture "before," "during" and "after" states during each makeup tutorial step from a plurality of makeup tutorial steps of a tutorial. One or more computer vision techniques, such as facial landmark detection, are used to align a captured makeup application step with one or more expected guidance masks. During use of the system 10 by a user, the system 10 can compare, for example, detected pigment and/or stroke placement of a user's actions against a target region(s) of the makeup tutorial and/or of a guidance mask(s). Optionally, a predefined deviation threshold can be used to determine whether/when the system detects that a step has been incorrectly executed (e.g., in accordance with the makeup tutorial). Optionally, the system 10 can determine/calculate one or more measures, which may include, by way of example: coverage percentage inside/outside the target region, symmetry between left and right sides, stroke length/angle, and relative thickness.

In some implementations, a decision flow for assessing the accuracy of a user's makeup application (also referred to herein as "outcomes") can include rule-based logic and/or confidence scoring (e.g., implemented using artificial intelligence (AI)). An example of rule-based logic is as follows: "if placement deviation>10%, then trigger correction." An example technique for performing confidence scoring is a trained machine learning/AI model(s) outputting a confidence value(s) for correct makeup application.

Depending on the outcome, the system 10 may one or more of: advance a makeup tutorial to a next tutorial step, advance a makeup tutorial to a subsequent tutorial step after the next tutorial step, transition a makeup tutorial to a previous tutorial step (e.g., an immediately preceding tutorial step, or a preceding step previous to the immediately preceding tutorial step), pause the tutorial, repeat a current overlay, modify a current overlay, provide corrective feedback (optionally before resuming), layering instructional logic onto AR overlays, advancing steps or adjusting content based on user behavior, replacing an overlay(s) based on state transitions, adjusting a tutorial-aware lighting control (as opposed to user proximity), etc.

In some implementations, a smart vanity mirror system 10 may include one or more of: tutorial-aware lighting control, voice navigation, or a creator ecosystem. The tutorial-aware lighting control can, for example, be implemented using the app(s) (app 117, app 126 and/or app 136), in that the app(s) can be configured to dynamically (e.g., at multiple times during the presentation of a makeup tutorial) at least one of: detect a lighting condition present in an environment where the smart vanity mirror system 10 is positioned, detect a degree/distribution of illumination of a face of a user, cause an adjustment (increase and/or decrease) to an intensity of a light of the smart vanity mirror system 10 (e.g., in response to detecting the lighting condition and/or in response to detecting the degree/distribution of illumination of the face of the user), cause a modification to a light saturation of the smart vanity mirror system 10, cause a modification to a light color temperature of the smart vanity mirror system 10.

Figure 2:
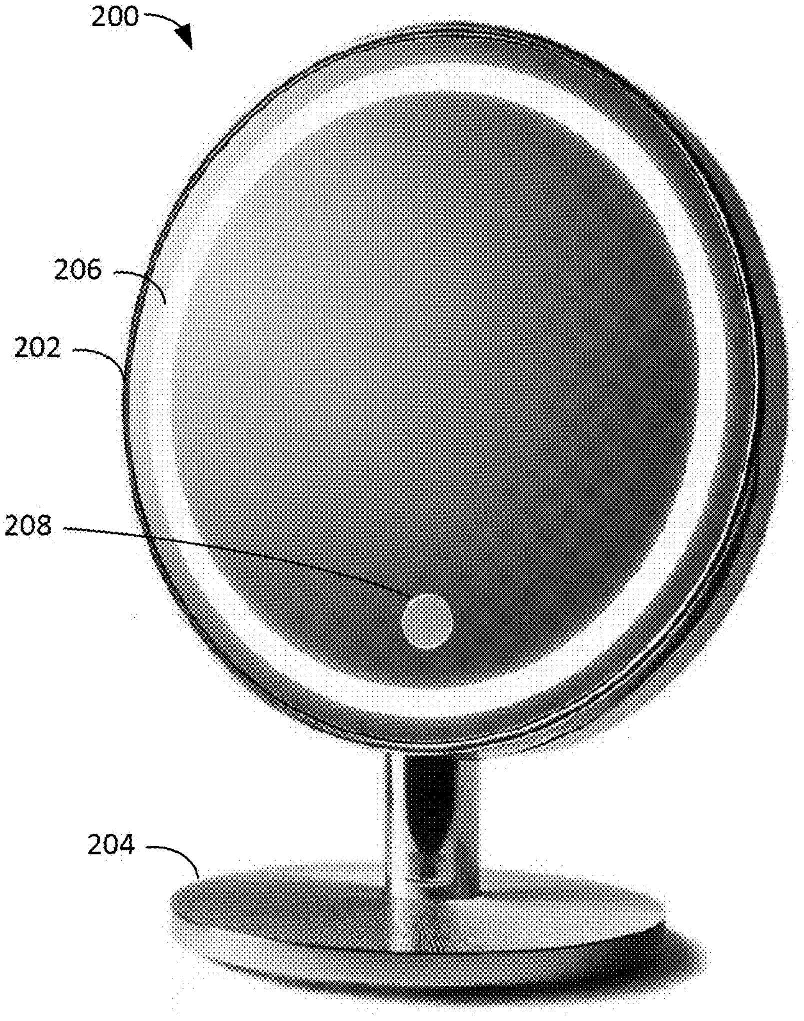
FIG. 2 depicts a smart vanity mirror, in accordance with some embodiments.

FIG. 2 depicts a smart vanity mirror 200 (e.g., structurally and/or functionally similar to the smart vanity mirror 100 of FIG. 1), in accordance with some embodiments. The smart vanity mirror 200 includes a frame 202 and a base 204. The smart vanity mirror 200 is freestanding. In some implementations, the frame 202 of the smart vanity mirror 200 can be tilted relative to the base 204 (e.g., manually and/or automatically via the position controller 118 of FIG. 1) to accommodate different makeup application angles and heights. For example, the position controller 118 adjusts the height/rotation of the frame 202 in response to user movement. In some implementations, the position controller 118 adjusts the height/rotation of the frame when the camera 108 determines/detects a change of position of the user. In some implementations, the height/rotation of the frame is manual. The height of the frame may need to be adjusted to align the eyebox of the AR software with the user's eyes. The smart vanity mirror 200 also includes a light source 206 that is substantially aligned with and positioned within (e.g., having a diameter that is less than) the outline of the frame 202. The light source 206 can be configured to selectively emit light having for example at least three different temperatures (e.g., natural sunlight, daytime, and nighttime). The smart vanity mirror 200 can include a button 208 to control navigation of a makeup look/tutorial, to control activation/deactivation of the light source 206, etc. In some implementations, the smart vanity mirror 200 includes a 3D camera (e.g., the camera 108) to analyze the face angle of the user to deliver precise makeup guidance. In some implementations, the camera is positioned in an upper portion of the frame 202 (e.g., away from the base 204).

In some implementations, the smart vanity mirror 100 and/or the smart vanity mirror 200 further includes at least one of a liquid crystal (LC) tunable-focus lens, an electrically tunable liquid lens, an Alvarez lens, a LCP based lens array, a piezoelectric tunable lens, an electromechanical tunable lens, a varifocal lens, or a split-Lohmann optics system. The at least one of the LC tunable-focus lens, the electrically tunable liquid lens, the Alvarez lens, the LCP based lens array, the piezoelectric tunable lens, the electromechanical tunable lens, the varifocal lens, or the split-Lohmann optics system can be at least partially disposed/positioned within the enclosure.

In some implementations, the smart vanity mirror 100 and/or the smart vanity mirror 200 further includes one or more lenses configured and/or software to dynamically adjust the effective focal distance between the display and the user's eye. During operation of the smart vanity mirror 100 and/or the smart vanity mirror 200, the one or more lenses can be used to translate a focal plane of a virtual image or overlay along an optical axis of the smart vanity mirror 100 and/or smart vanity mirror 200, for example to compensate for the user's viewing distance and/or alignment. In some embodiments, software can be used to adjust graphical scale or positional cues to maintain perceived alignment of the virtual image. Depending on the implementation, this translation can be achieved mechanically (for example, through lens movement), electronically (for example, through modulation of optical elements such as a liquid lens or a variable-focus element), and/or using software. In some instances, a goal is to maintain proper image sharpness and alignment as the user's position relative to the smart vanity mirror 100 and/or the smart vanity mirror 200 changes.

Figure 3C:
FIG. 3C depicts the smart vanity mirror in a third step of a guided beauty app, in accordance with some embodiments.
Figure 3B:
FIG. 3B depicts the smart vanity mirror in a second step of a guided beauty app, in accordance with some embodiments.
Figure 3A:
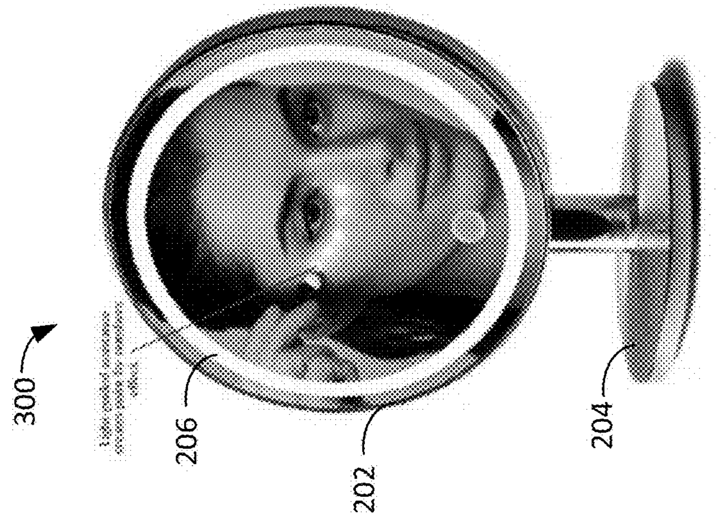
FIG. 3A depicts the smart vanity mirror in a first step of a guided beauty software application ("app"), in accordance with some embodiments.

FIG. 3A depicts the smart vanity mirror 200 in a first use case 300 of a guided makeup application. FIG. 3B depicts the smart vanity mirror 200 in a second use case 302 of the guided makeup application. FIG. 3C depicts the smart vanity mirror 200 in a third use case 304 of the guided makeup application. Users can control navigation between/among the first, second, and third use cases 300, 302, 304 via touch (e.g., swiping a touchscreen sensor of the smart vanity mirror 200), gesture detection/control (e.g., via the camera 108), or voice activation. In some implementations, a touch sensor or a microphone (e.g., the microphone 110 of FIG. 1) are located on the base 204. As shown in FIG. 3A, the first use case 300 is described/demonstrated/previewed using overlaid graphics displayed by a display system (e.g., the display system 104 of FIG. 1). The overlaid graphics in FIG. 3A include light-guided images that assist the user by creating a paint-by numbers effect (e.g., to show where to apply concealer relative to an eye). In some implementations, the light-guided images vary in brightness, warmth, or contrast based on a representation of a face of the user, how a user is executing a makeup look, etc. In some implementations, the light source 206 can vary in brightness, warmth, or contrast along a circumferential boundary of the frame 202 (e.g., based on locations of the overlaid graphics on the analog mirror). As shown in FIG. 3B, the second use case 302 is described/demonstrated/previewed using overlaid graphics that outline/demarcate eyelids on the user's face. In some such implementations, the smart vanity mirror 200 provides voice instructions by playing an audio file on a speaker (e.g., the speaker 106 of FIG. 1). For example, the voice instructions can recite "Step 2: Apply your eyeshadow from lash line to crease." As shown in FIG. 3C, the third use case 304 is described/demonstrated/previewed using overlaid graphics that outline/demarcate eyebrows on the user's face. In some such implementations, the smart vanity mirror 200 provides application guidance to the user by progressively illuminating the overlay (e.g., similar to an animation), by displaying text via the display system (e.g., "Step 2: Lightly apply brow liner where indicated," and/or by playing the foregoing message as an audio message.

Figures 4A, 4B, 4C, 4D, 4E:
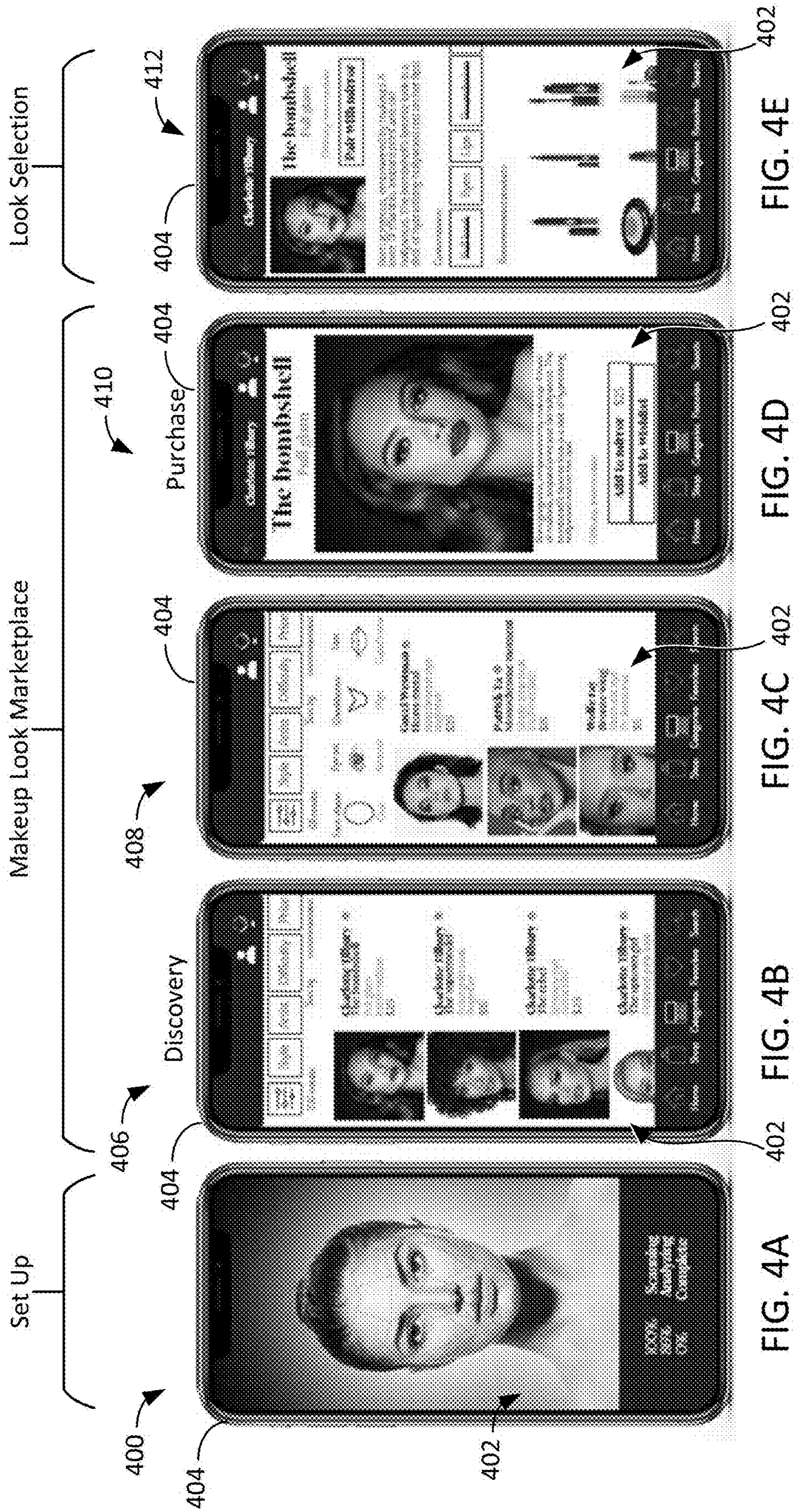
FIG. 4A depicts a set up screenshot of a makeup look application process performed by a guided beauty app, in accordance with some embodiments.
FIGS. 4B and 4C depict discovery screenshots of a makeup look application process in a guided beauty app, in accordance with some embodiments.
FIG. 4D depicts a purchase screenshot of a makeup look application process in a guided beauty app, in accordance with some embodiments.
FIG. 4E depicts a pairing screenshot of a makeup look application process in a guided beauty app, in accordance with some embodiments.

FIG. 4A depicts a setup screenshot 400 (e.g., page) of a makeup look application process performed by an app 402 (e.g., structurally and/or functionally similar to the app 117, the app 126 and/or the app 136 of FIG. 1) on a mobile device 404 (e.g., structurally and/or functionally similar to the consumer device 120 of FIG. 1). In some implementations, the mobile device 404 includes a front facing camera that scans the user's face. In other implementations, the mobile device 404 accesses a scan of the user's face from a smart vanity mirror (e.g., the smart vanity mirror 100 of FIG. 1 and/or the smart vanity mirror 200 of FIG. 2). In turn, the app 126 uses AR technology to map out points on the user's face. FIGS. 4B and 4C depict discovery screenshots 406, 408, respectively, of a makeup look application process in the app 402. The app 402 includes a makeup look marketplace through which the user can browse free looks, verified MUA looks, and user generated looks. Further, the app 402 can suggest looks based on facial features of the user and desired feature emphasis. The marketplace allows users to unlock beauty creativity by exploring new styles and trends.

FIG. 4D depicts a purchase screenshot 410 of a makeup look application process in the app 402. The app 402 enables users to buy and save makeup looks. Further, the app 402 enables users to add makeup looks to their library and/or to a wishlist, and to search products used. FIG. 4E depicts a pairing screenshot 412 of a makeup look application process in the app 402. Once the user selects a makeup look (i.e., completes look selection) from the catalog, the user can choose to pair/upload the makeup look to their smart vanity mirror (e.g., the smart vanity mirror 100 of FIG. 1 and/or the smart vanity mirror 200 of FIG. 2). In some implementations, the app 402 enables the user to customize a selected makeup look prior to uploading or pairing the makeup look with their smart vanity mirror.

One or more embodiments of the present disclosure are compatible with and/or configured to accommodate one or more of the following features/applications:

Interactive Games
- Reflective games such as puzzles or virtual escape rooms in which users interact with one or more on-screen elements using gestures, such as dodging or hitting virtual objects.

Health and Therapy Guidance
- Support for posture correction, injury recovery, and facial therapy exercises, with AR overlays that provide real-time feedback on alignment and movement.

Fitness Training
- Guidance for workouts like yoga, Pilates, and strength training, focusing on form corrections and progress tracking.

Presentation Practice
- Tools to practice speeches or interviews with AR feedback on posture, facial expressions, and engagement metrics like eye contact.

Learning and Language Practice
- AR overlays for activities like pronunciation guides or gesture-based language learning (especially ASL).

Meditation and Mental Wellness
- Immersive AR environments for meditation or mood tracking, with calming visuals and reflective prompts.

Enhanced Entertainment
- AR-enhanced media experiences, such as interactive music visualizations or other content.

FIG. 5 depicts an optical diagram of an optical system 500 of a smart mirror configured to display overlay graphics to a user, in accordance with some embodiments. In some embodiments, the smart mirror includes a magnifying mirror optically coupled to an off-axis display system via one or more optical elements (or optical components), while in other embodiments the smart mirror includes a partially reflective dielectric mirror bonded or closely coupled to (e.g., affixed directly to) a display. In some embodiments, the smart mirror can include a display with one or more optical elements (e.g., lenses, mirrors, windows, etc.). In some embodiments, the one or more optical elements can be configured (e.g., collectively) to align the display image plane with the reflected image plane so the displayed image plane and the reflected image plane appear at the same position (e.g., the same distance from the mirror 505). The reflected image plane is the image plane produced by the light reflected from the smart mirror. As shown, the smart mirror can include or be coupled to a display 504, a first optical element or set of optical elements (e.g., one or more lenses) 506, a second optical element 508 (e.g., a mirror, beam splitter, or any other reflective or partially reflective element, etc.), and/or a mirror 505 (e.g., a magnifying mirror). In some embodiments, the optical system 500 can include a heads-up display (or quasi-heads-up display) as opposed to an optical stack where the mirror and display surfaces are stacked. For example, the display 504 that emits light can be disposed at an angle (e.g., a substantially perpendicular angle) from the mirror 505 (e.g., structurally and/or functionally similar to the analog mirror described in FIG. 1). The optical system 500 can be a more compact arrangement than optical stacking. Additionally, the optical system 500 can achieve precise optical alignment. The display 504 is configured to emit light (e.g., associated with or corresponding to a graphic such as any of the graphics described herein). In some embodiments, the display 504 can include a display embedded in the smart mirror. In some embodiments, the display 504 can be coupled to the smart mirror. For example, the display can include a compact display (such as, by way of non-limiting example, a smartphone display) or a compact projection module (e.g., including emissive or reflective display technologies) operatively coupled to the smart mirror. In some embodiments, light emitted from the display 504 travels along light path 501 through the first optical element(s) (e.g., a lens) 506 and is reflected off the second optical element 508 positioned behind the mirror 505 (e.g., positioned further from a user-facing surface of the mirror 505). In some embodiments, the second optical element 508 can reflect the light emitted (or fold the optical path) from the display 504 such that the light is directed towards the eyes of the user 550. In some embodiments, the second optical element 508 allows a light path from the light-emitting surface of the display 504 to be positioned at an angle relative to an axis of the user's eyes. For example, the second optical element 508 can be angled relative to the display 504 such that the second optical element 508 reflects the light emitted from the display 504 substantially perpendicularly. In some embodiments, the second optical element 508 can be positioned at an angle between 25 degrees and 60 degrees from the display 504, inclusive of all values and ranges therebetween.

In some embodiments, the second optical element 508 can be positioned at an angle of about 45 degrees, for example.

After reflection from the second optical element 508, the light reflected can be transmitted through the mirror 505 to the user. The mirror 505 can be partially transmitting such that a sufficient amount of light from the display 504 can be transmitted to the user such that the user 550 can see the graphics from the display 504. In some embodiments, the mirror 505 can be configured to magnify a reflection of the user. In some embodiments, the mirror 505 can be curved, and distortion introduced by the curvature of the mirror 505 can be compensated by one or more optical components/elements of FIG. 5, such as the display 504, the first optical element(s) 506, the second optical element 508, and/or software. Depending on the implementation, the first optical element(s) 506 may include a "stack" of optical components/elements, a plurality of layers, etc., and the compensation for distortion or magnification effects introduced by the curvature of the mirror 505 may be achieved using all or a subset of the stack of optical components, or all or a subset of the plurality of layers. The first optical element(s) (e.g., one or more lenses) 506 disposed along the light path 501 after the display can be configured to establish an apparent image distance such that the displayed image (e.g., the image the user 550 perceives) is correctly formed and appears at a corresponding scale through the mirror 505. For example, the first optical element(s) 506 can establish the apparent image distance such that the generated image and the user's reflection appear at a common virtual depth. For example, the first optical element(s) 506 can adjust the apparent image distance such that the generated image and the user's reflection are at the same focal distance. The first optical element(s) 506 can be configured to compensate for aberrations and distortions, contributing to the clarity and accuracy of the displayed image (e.g., the tutorial graphics). In some embodiments, the first optical element(s) 506 can include lenses such as any of the lenses described with respect to FIGS. 1-2. In some embodiments, optical element(s) (e.g., the first optical element(s) 506 and/or the second optical element 508) and/or software can optionally be configured to dynamically adjust the effective focal distance between the display and the user's eye. The optical element(s) can optionally be used to translate a focal plane of a virtual image or overlay along an optical axis of the mirror 505, for example to compensate for the user's viewing distance and/or alignment. In some embodiments, software can optionally be used to adjust graphical scale or positional cues to maintain perceived alignment of the virtual image. Depending on the implementation, this translation can be achieved mechanically (for example, through lens movement), electronically (for example, through modulation of optical elements such as a liquid lens or a variable-focus element), and/or using software. In some instances, a goal is to maintain proper image sharpness and alignment as the user's position relative to the smart vanity mirror 505 changes.

The display system can differ from known heads-up displays in which a displayed image is reflected off of a partially reflective, partially transmitting window (e.g., a windshield or combiner) through which a user views an external scene. In such systems, the user simultaneously views the outside world and the displayed graphics through the same surface, which can require complex optical design and manufacturing. In contrast, the optical system shown in FIG. 5B is configured to overlay graphics on a reflection of the user rather than on a view of an external environment. The user views the projected image as overlaid on the reflective surface of mirror 505 after the image is redirected by optical element 508.

Figure 6:
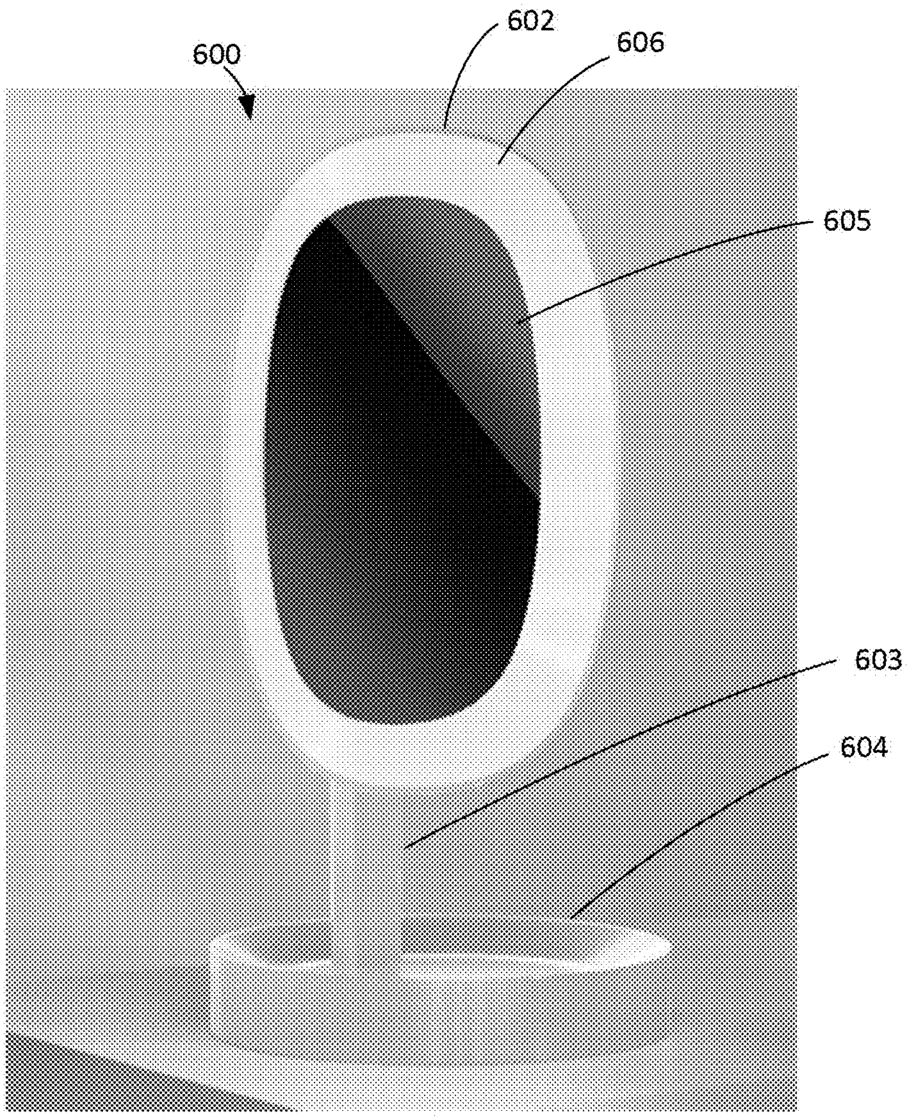
FIG. 6 depicts a smart vanity mirror, in accordance with some embodiments.

FIG. 6 depicts a smart vanity mirror 600 (e.g., structurally and/or functionally similar to the smart vanity mirror 100 of FIG. 1 or smart vanity mirror 200 of FIG. 2), in accordance with some embodiments. The smart vanity mirror 600 includes a frame 602 (or a housing) and a base 604. In some embodiments, the smart vanity mirror 600 is freestanding. In some embodiments, the frame 602 of the smart vanity mirror 600 can be configured to be tilted or angled relative to the base 604 (e.g., manually and/or automatically via the position controller 118 of FIG. 1) to accommodate different makeup application angles and heights. The position control of the smart vanity mirror 600 is described further with respect to FIGS. 1-2. In some embodiments, the smart vanity mirror 600 can include a support member 603 (e.g., a vertical support or arm) that can be configured to adjust a height of the frame 602 relative to the base 604. In some embodiments, the height of the frame can be adjusted to align one or more optical elements and/or portions of the display with the user's eyes. The smart vanity mirror 600 also includes a light source 606 that is disposed around an outer perimeter of the reflective surface 605 of the smart vanity mirror 600. The light source 606 can be configured to selectively emit light having different temperatures, hues, colors, and/or intensities. The smart vanity mirror 600 can include one or more input devices (not shown). For example, the smart vanity mirror 600 can include one or more actuators such as buttons, touchpads or touchscreens, etc. such that the user can control operation of the smart vanity mirror 600. In some implementations, the smart vanity mirror 600 includes a 3D camera (e.g., the camera 108) and/or other depth sensing technologies to analyze the face angle of the user to deliver precise makeup guidance.

In some implementations, the smart vanity mirror 600 can include a display disposed within the frame 602 and/or base 604 (e.g., a housing of the smart vanity mirror 600). In some embodiments, the display can include any of the display systems described herein. In some embodiments, the display can include an optical stack or a projection optical path design (or quasi heads-up display optical path design similar to optical system 500).

Figure 7A:
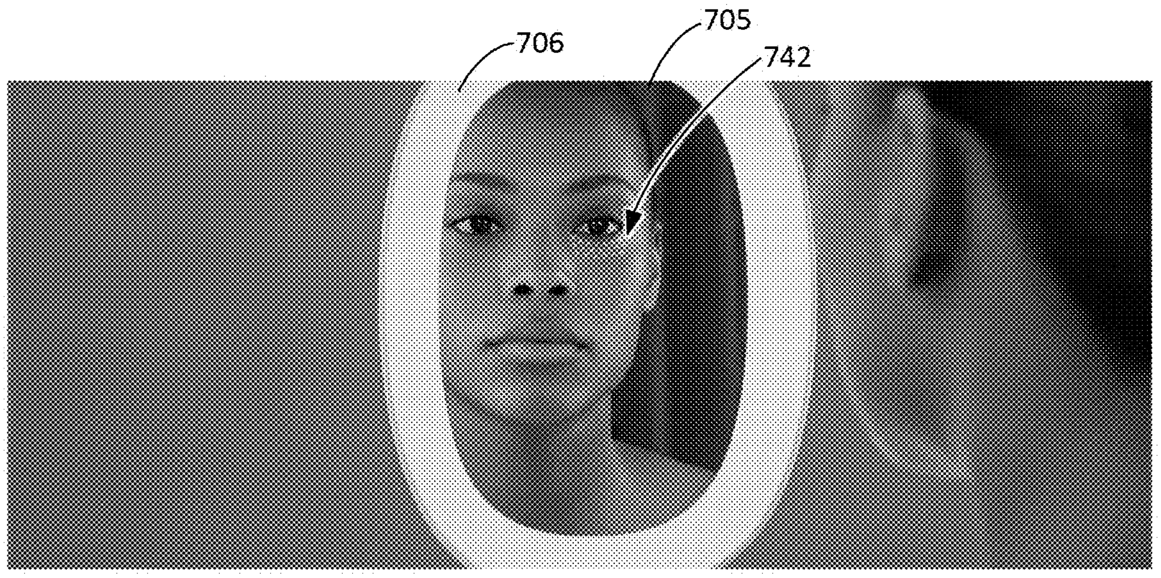
FIGS. 7A-7B depict overlay graphics generated by the smart vanity mirror over a reflection of a user's face, in accordance with some embodiments.
Figure 7B:
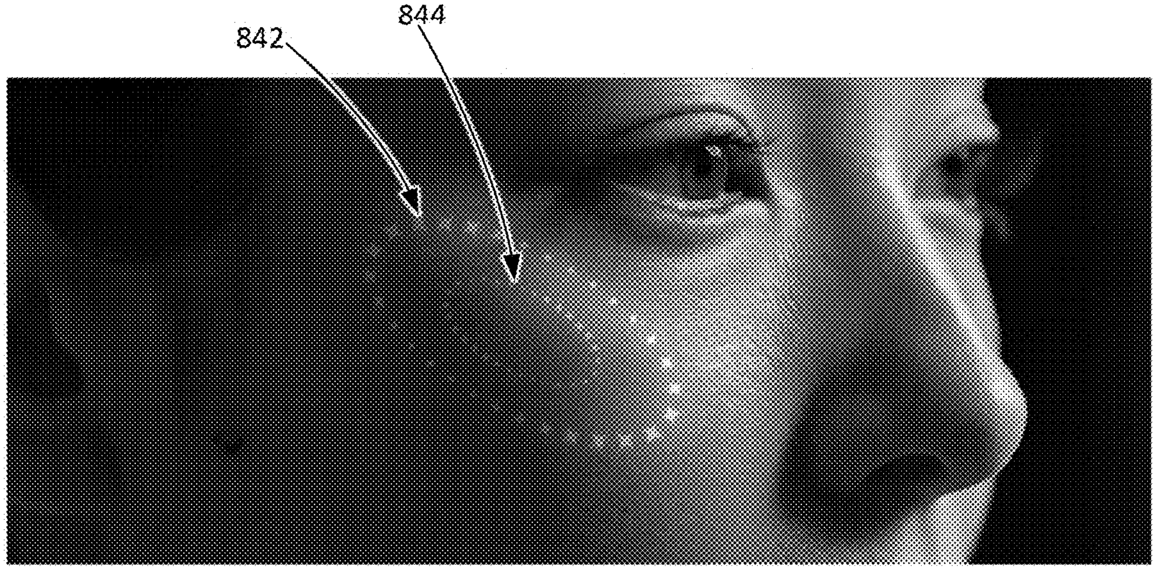

FIGS. 7A-7B depict overlay graphics generated by the smart vanity mirror over a reflection of a user's face, in accordance with some embodiments. FIG. 7B shows an overlay graphic 742 indicating a portion under the eye to which the user should apply the makeup product (e.g., a concealer). As shown, the user can view a reflection of their face via the analog mirror 705, and the overlay graphic 742 is overlaid over a related/associated region of the face of the user (e.g., under the eye) in or at a focal plane related/associated to a surface of the user's face in the reflection (e.g., at the same apparent focal plane as the reflected face). As shown in FIG. 7B, the smart vanity mirror can generate an overlay graphic that indicates, for example, one or more regions 842, 844 to which the user should apply a product (e.g., a makeup or skin product), how to layer multiple products on a particular region of the face, the technique with which the user should apply the product, and/or how heavy to apply a product in a particular region of the face.

Figure 8D:
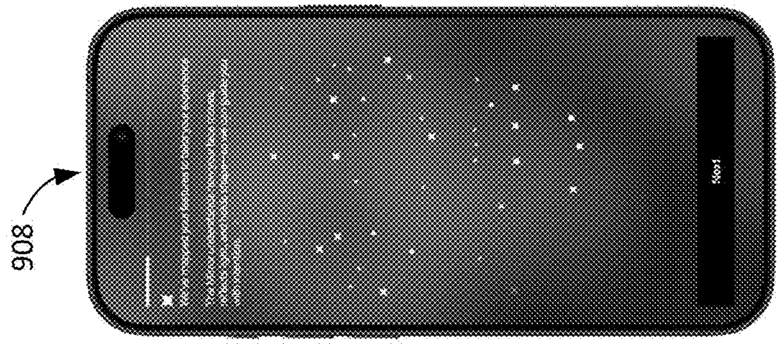
FIGS. 8A-8D depict steps of a setup process in a guided beauty app, in accordance with some embodiments.
Figure 8C:
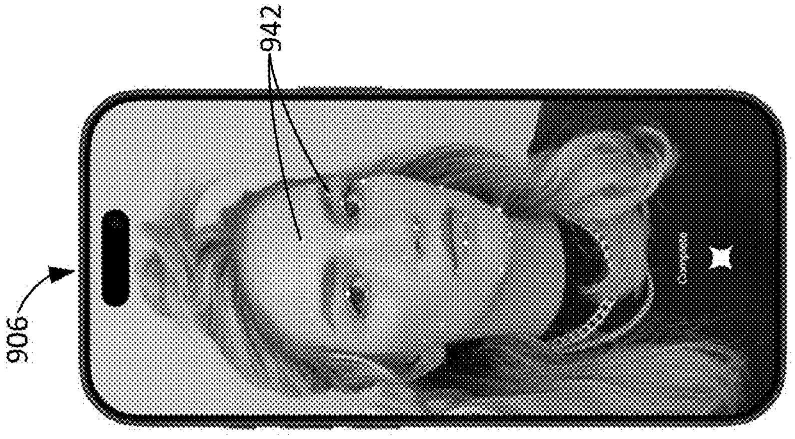
Figure 8B:
Figure 8A:
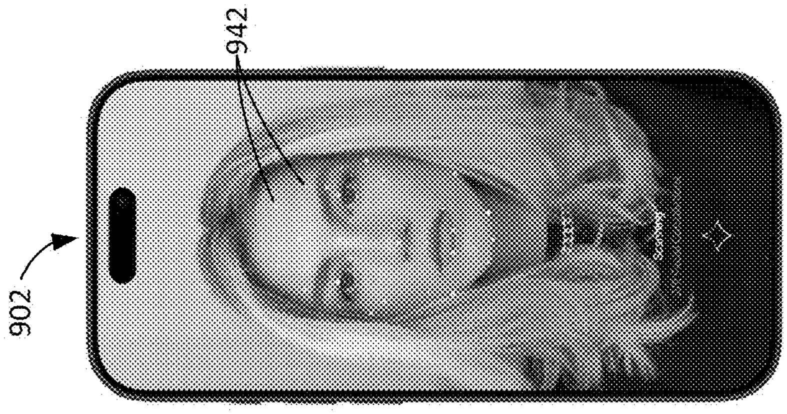

FIGS. 8A-8D depict steps 902, 904, 906, 908 of a setup process in a guided beauty app, in accordance with some embodiments. The guided beauty app can be executed on a compute device such as a consumer device (e.g., a smartphone). In some embodiments, the guided beauty app can be similar to or the same as app 126. As shown in FIG. 8A, the app can be configured to cause a camera of the consumer device and/or a camera of the smart vanity mirror to capture an image or video of the face of the user. The app can be configured to scan the image data for facial information or features of the face such as face shape and/or anatomical landmarks 942. In some embodiments, the app can display the anatomical landmarks 942 overlaid on the user's face. As shown in FIG. 8B, the app can be configured to analyze the image data for facial information associated with or corresponding to at least one of face shape or structure and/or anatomical landmarks (e.g., facial features). In some embodiments, the anatomical landmarks 942 can include, for example, key locations (e.g., x, y, and/or z coordinates) that are associated with or correspond to the lips, nose, eyes, eyebrows, cheeks, etc. In some embodiments, the app can analyze anatomical landmarks detected to determine a spatial relationship between anatomical landmarks. As shown, the app can indicate to the user that an analysis process is occurring. As shown in FIG. 8C, the app can display to the user that the anatomical landmarks determined from the image data are confirmed. As shown in FIG. 8D, the app can generate product and/or tutorial recommendations based on the facial information (e.g., facial shape and/or features).

Figure 9A:
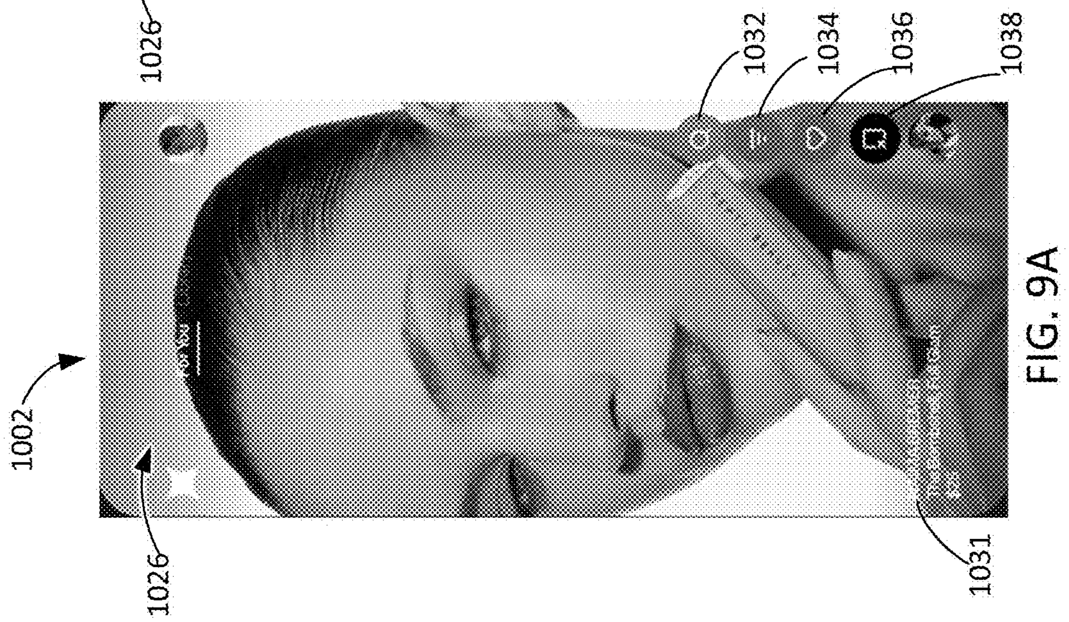
FIGS. 9A-9C depict a user interface in a guided beauty app through which a user can explore beauty related content, in accordance with some embodiments.
Figure 9B:
Figure 9C:
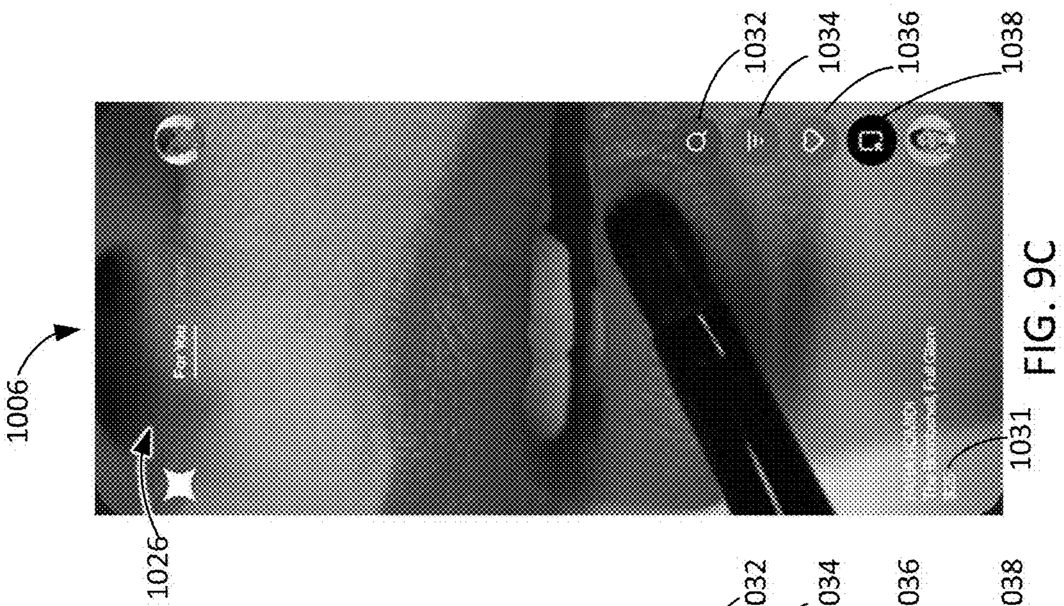
Figures 10A, 10B, 10C, 10D, 10E:
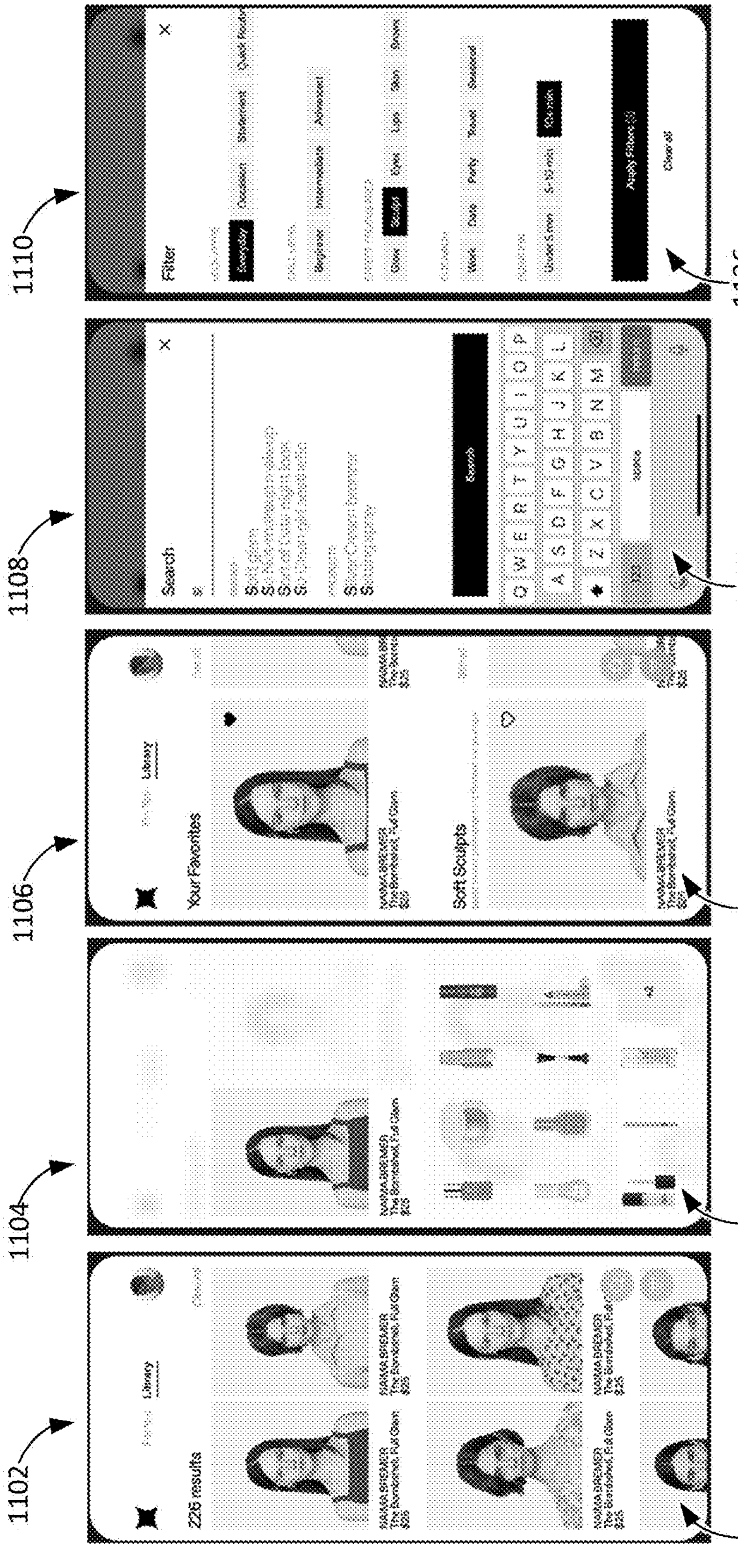
FIGS. 10A-10E depict a user interface in a guided beauty app through which a user can explore makeup related content, in accordance with some embodiments.

FIGS. 9A-9C depict snapshots 1002, 1004, 1006 a user interface 1126 in a guided beauty app through which a user can explore beauty related content, in accordance with some embodiments. In some embodiments, the user interface 1026 can include a media (e.g., photos, video, etc.) navigation interface (e.g., a feed view) in which a user can browse through media associated with tutorials (e.g., images, videos, written instructions, etc.) that can be used with the smart vanity mirror. In some embodiments, the user interface can appear in a feed that the user can scroll through to view different tutorial content. In some embodiments, the app can adapt or modify recommendations for videos based on the preferences of the user collected over time (e.g., via user input and/or user data). In some embodiments, the user interface 1026 can include one or more buttons 1032, 1034, 1046, 1038 for interacting with a video. For example, the user interface 1026 can allow the user to save the video, filter content 1034, "like" or favorite the video 1036, search for content 1032, initiate guidance with the smart vanity mirror 1038 (e.g., a pairing button), etc.

FIGS. 10A-10E depict snapshots 1102, 1104, 1106, 1108, 1110 a user interface in a guided beauty app 1126 through which a user can explore beauty related content, in accordance with some embodiments. In some embodiments, the user interface can include a grid navigation or grid view that allows the user to browse tutorials by categories (FIGS. 10A-10B), favorites (FIG. 10C), search and filter result (FIGS. 10D-10E), etc. In some embodiments, the grid navigation allows the user to review makeup products featured in each look. In some embodiments, the app allows the user to toggle between the feed view and a grid view.

Figure 11C:
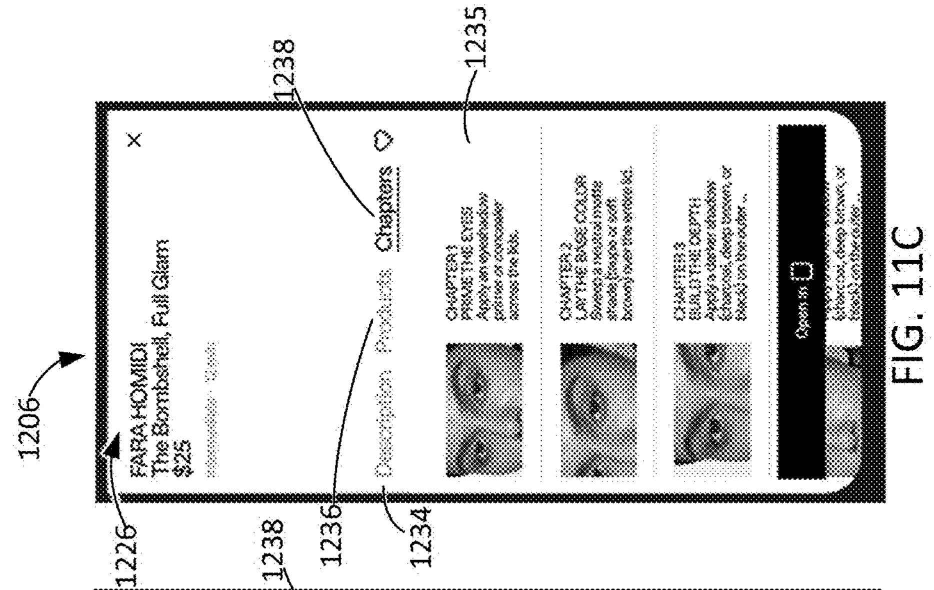
FIGS. 11A-11C depict a user interface in a guided beauty app through which a user can explore details of a makeup look, in accordance with some embodiments.
Figure 11B:
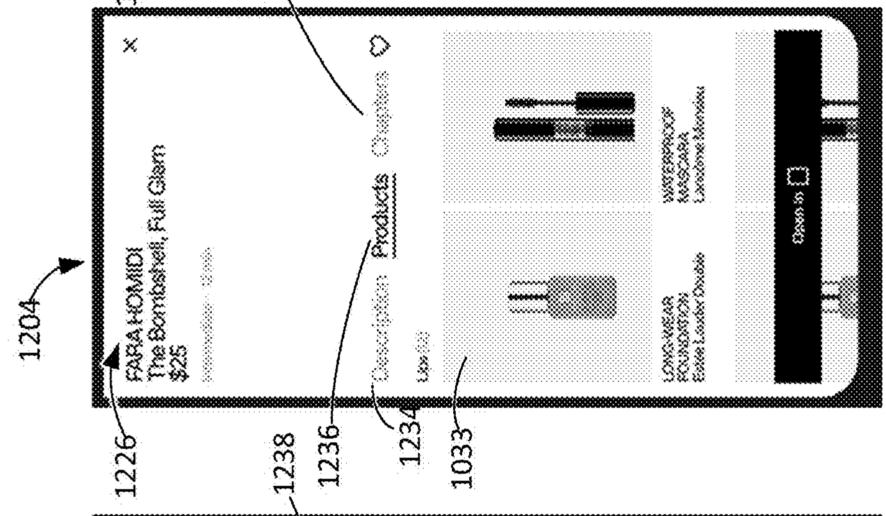
Figure 11A:
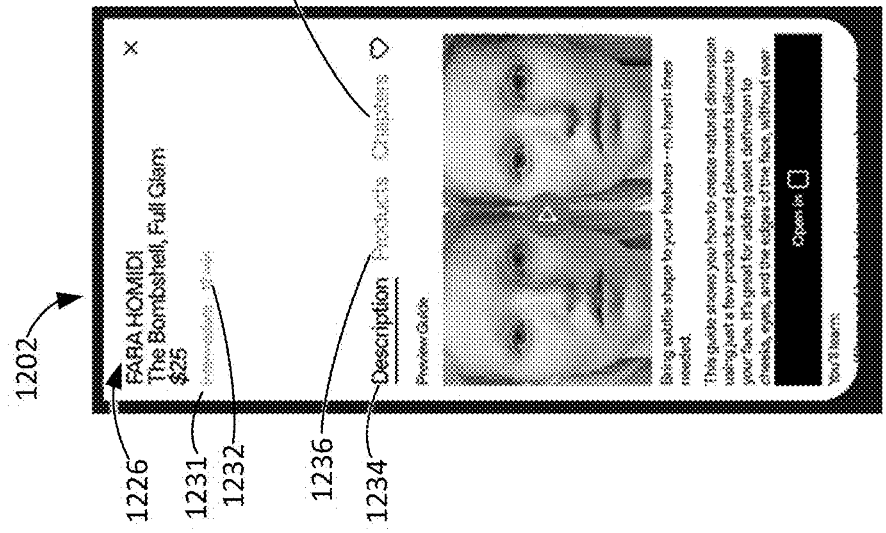

FIGS. 11A-11C depict snapshots 1202, 1204, 1206 a user interface 1226 in a guided beauty app through which a user can explore details of a makeup look, in accordance with some embodiments. In the details page, the user interface 1126 can display a difficulty level 1231 of application of the look and a time estimation 1232 to complete the look. The user interface 1226 includes a description button 1234, a products button 1236, and a chapters button 1238, which allow the user to select between a description of the look (FIG. 11A), a list of the products (FIG. 11B), or chapters (or steps) of the tutorial (FIG. 11C). The description of the look provides an overview of the tutorial including, for example, before and after photos or videos, and/or a written description of the look. The list of the products can include images of the products 1033 and information. In some embodiments, the products page allows the user to purchase products through the app. The chapters page breaks the tutorial down into modules or steps 1235 (e.g., foundation application, eyeshadow application, etc.) of the overall tutorial.

Figure 12A:
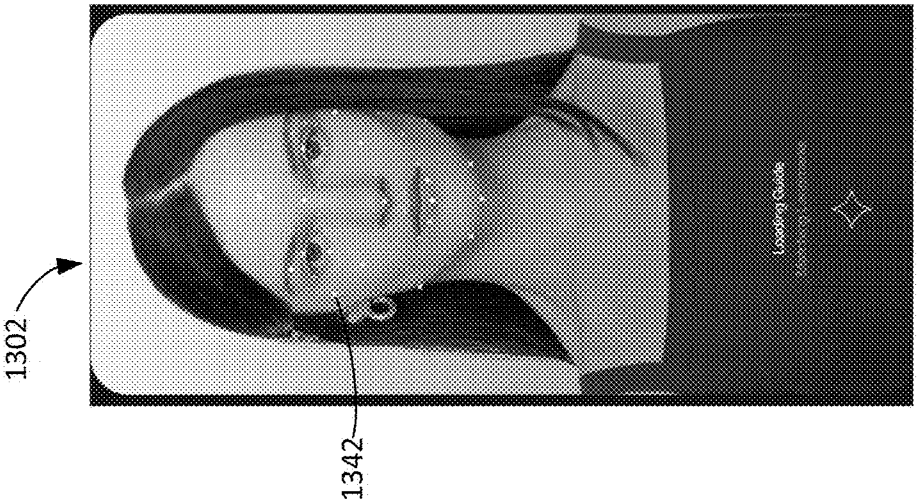
FIGS. 12A-12D depict a makeup look application process in a guided beauty app, in accordance with some embodiments.
Figure 12B:
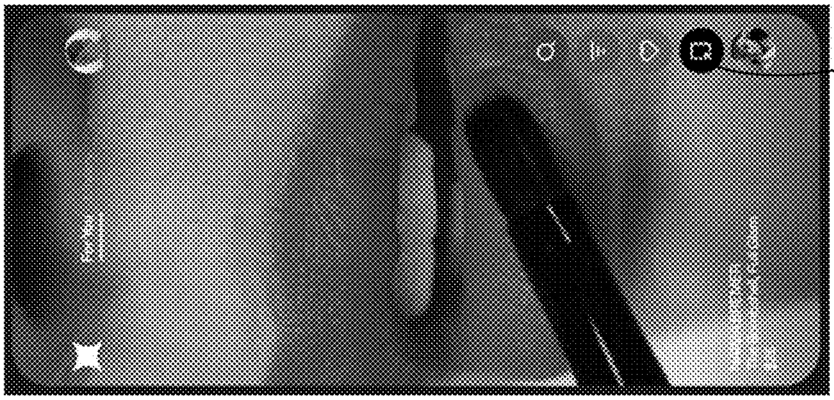
Figure 12C:
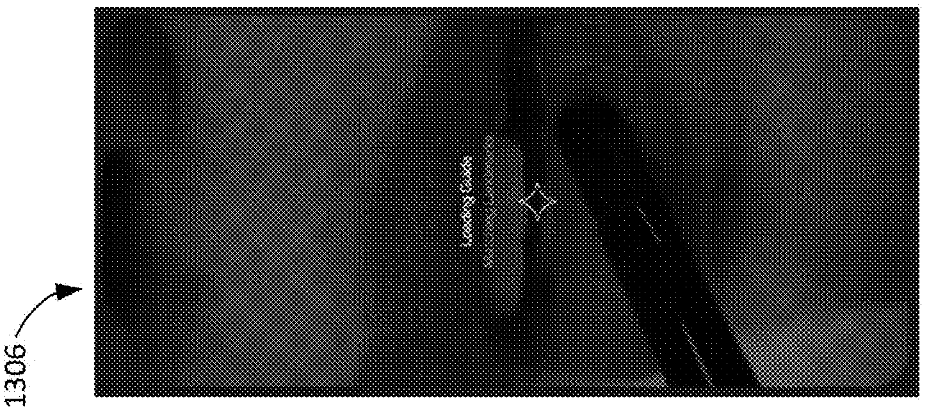
Figure 12D:
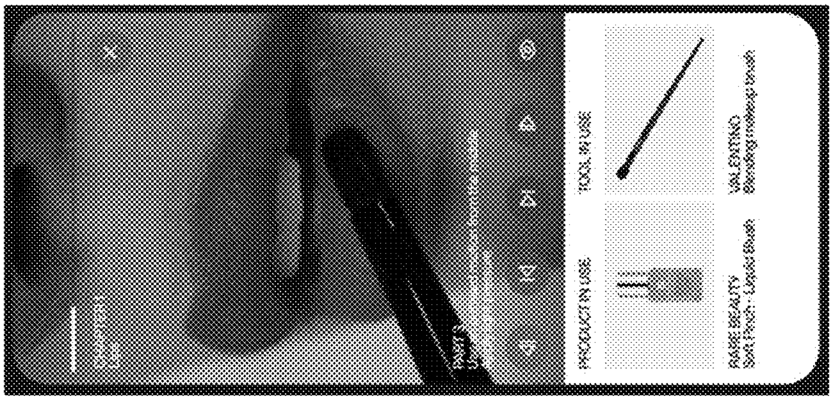

FIGS. 12A-12D depict snapshots 1302, 1304, 1406, 1308 of a makeup look application process in a guided beauty app, in accordance with some embodiments. As shown in FIG. 12A, the app can load the anatomical landmarks 1342 of the tutorial (e.g., default locations of anatomical features) before and/or during guidance of a look, and the guidance can be based on and/or adjusted according to the anatomical landmarks of the user (e.g., based on a comparison of, and an identified difference between, the anatomical landmarks 1342 of the tutorial to the anatomical landmarks of the user). In some embodiments, a processor of the smart vanity mirror (not shown) can detect the anatomical landmarks of the user and adjust the guidance (e.g., the overlay instructions) based on the anatomical landmarks of the user. In some embodiments, the smart vanity mirror can detect and/or analyze the anatomical landmarks and adjust the guidance in real-time or near real-time as the user advances through the tutorial. As shown in FIG. 12B, the app can receive a user selection of a tutorial (e.g., as the user is exploring the discovery interfaces). For example, the app and smart vanity mirror can initiate pairing in response to the user selecting the pairing button 1338. As shown in FIG. 12C, the smart vanity system pairs the look with the smart vanity mirror and personalizes the tutorial to the facial features of the user (e.g., determined by the anatomical landmarks). FIG. 12D shows an example of the app displaying a step of the tutorial (e.g., the step of applying lip makeup). As shown, the app can display examples of products used in the step of the tutorial and can provide an ability to shop for the corresponding products. In some embodiments, the user interface can display information associated with or corresponding to the chapter or step of the tutorial, and the user can initiate guidance on the smart vanity mirror via this interface. In some embodiments, the app can be configured to cause the consumer device and/or the smart vanity mirror to display content associated with or corresponding to the tutorial. In some embodiments, the tutorial content can include a product to apply, a tool to apply the product, a region of the face to apply the product, and a technique with which to apply the product. In some embodiments, the consumer device can provide links for the user to purchase a product displayed in the tutorial. For example, the app can provide a link to purchase a product during a step of the tutorial in which the product is recommended to be used. In some embodiments, the app can provide a link to purchase one or more products before the tutorial begins or after the tutorial ends. In some embodiments, only the smart vanity mirror provides instructions to the user, associated with or corresponding to the tutorial.

Figure 13A:
FIGS. 13A-13E depict steps of a beauty tutorial displayed on a smart vanity mirror, in accordance with some embodiments.
Figure 13B:

FIGS. 13A-13E depict steps of a beauty tutorial displayed on a smart vanity mirror 1405, in accordance with some embodiments. As shown in FIG. 13A, the smart vanity mirror 1405 can optionally display an introduction that indicates the look or tutorial the user selected (e.g., in the app). In some embodiments, the smart vanity mirror 1405 can generate an overlay 1442 of the title of the look or tutorial the user selected. As shown in FIG. 13B, the smart vanity mirror 1405 recognizes and aligns anatomical landmarks (e.g., at least some of the anatomical landmarks detected represented as stars in FIG. 13B) of the face of the user. In some embodiments, aligning the anatomical landmarks can include using the detected landmarks on the user's face as reference points that are matched to corresponding landmarks associated with a model face (e.g., a face model of a creator, model, or tutorial reference). This landmark-to-landmark mapping can be used to place, scale, and orient tutorial graphics so that the guidance appears in the correct location on the user's face.

Figure 13C:
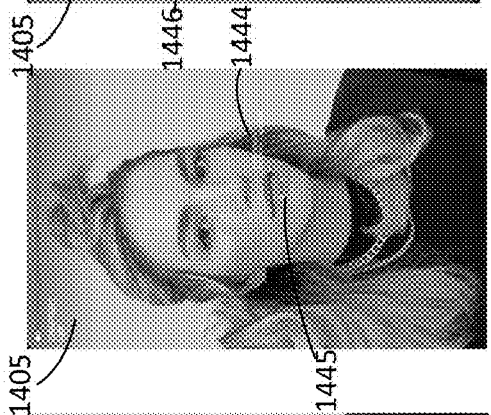
Figure 13D:
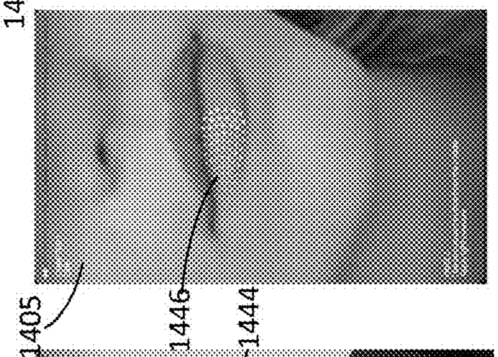
Figure 13E:

In some embodiments, the smart vanity mirror 1405 can display stars representing at least some of the anatomical landmarks to indicate to the user the mirror is sensing their facial features. As shown in FIG. 13C, the mirror can display personalized steps of the selected tutorial based on the anatomical landmarks (e.g., the landmark-to-landmark mapping). As shown, the smart vanity mirror 1405 displays a graphic overlay 1445 associated with or corresponding to a step of application of lip makeup. The graphic overlay 1445 can include an indication of where to apply the product as well as which product to apply at the location indicated. The smart vanity mirror 1405 can be configured to modify the graphic overlays in real-time or near real-time as the user moves. As shown in FIG. 13D, the smart vanity mirror 1405 can adjust the graphic overlay (e.g., the on-face guidance) 1446 as a user moves closer to the smart vanity mirror 1405 for detail work. In some embodiments, the guidance overlay 1446 can become more detailed as the user moves closer to the smart vanity mirror. As shown in FIG. 13E, the smart vanity mirror 1405 can advance to a next step in the tutorial once the previous step is completed. The smart vanity mirror 1405 can display a subsequent graphic overlay 1448 associated with or corresponding to the next step of the tutorial. In some embodiments, the graphic overlay 1448 can include product details for a step of the tutorial. In some embodiments, the graphic overlay 1448 with product details can be overlaid on or near a region of the face on which the product is recommended to be used. In some embodiments, when the graphic overlay 1448 with product details is displayed, the beauty app can provide a link to purchase the product. In some embodiments, the smart vanity mirror 1405 can indicate to the user a step of the tutorial the user is on (e.g., by overlaying text 1447 as shown).

Figure 14:
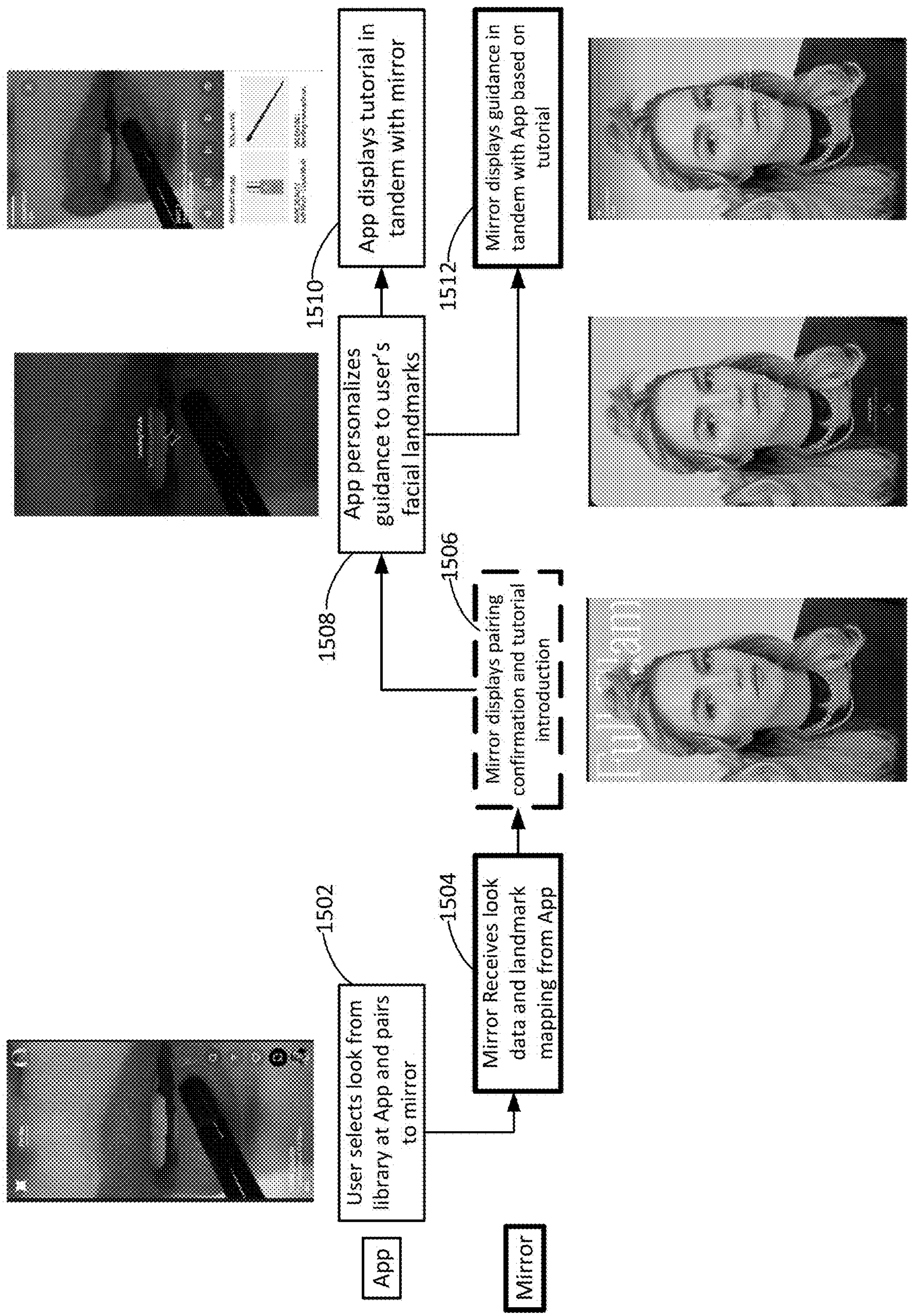
FIG. 14 is a flow chart diagram of an example method of providing a guided beauty tutorial to a user via the interconnectivity of a guided beauty app and a smart mirror system, in accordance with some embodiments.

FIG. 14 is a flow chart diagram of an example method of providing a guided beauty tutorial to a user via a guided beauty app (i.e., "app") and smart vanity mirror (i.e., "mirror"), in accordance with some embodiments. As shown, the app of a consumer device can be configured to receive a user selection of a look from a library at the app, at 1502, and either in response to a user input or automatically in response to the selection of the look, "pair" the look to the mirror (e.g., to establish a communication link between the app and the mirror). The mirror can receive the look data, at 1504. In some implementations, the mirror can optionally perform anatomical landmark mapping. For example, the mirror may detect the anatomical landmarks in real-time or near real-time as the user uses the smart vanity mirror. The mirror can optionally store anatomical landmark mapping data locally to the mirror and/or send the anatomical landmark mapping data to the app for storage on the consumer device. The mirror can optionally display a pairing confirmation and tutorial introduction display, at 1506. In some embodiments, the app can be configured to personalize guidance to the user's facial landmarks (i.e., anatomical landmarks), at 1508. In some embodiments, the app can be configured to display the tutorial in tandem with the mirror, at 1510. The mirror can display guidance in tandem with the app based on the tutorial, at 1512. The method of providing the guided beauty tutorial is described in further detail below with respect to FIGS. 15A-15B.

Figure 15A:
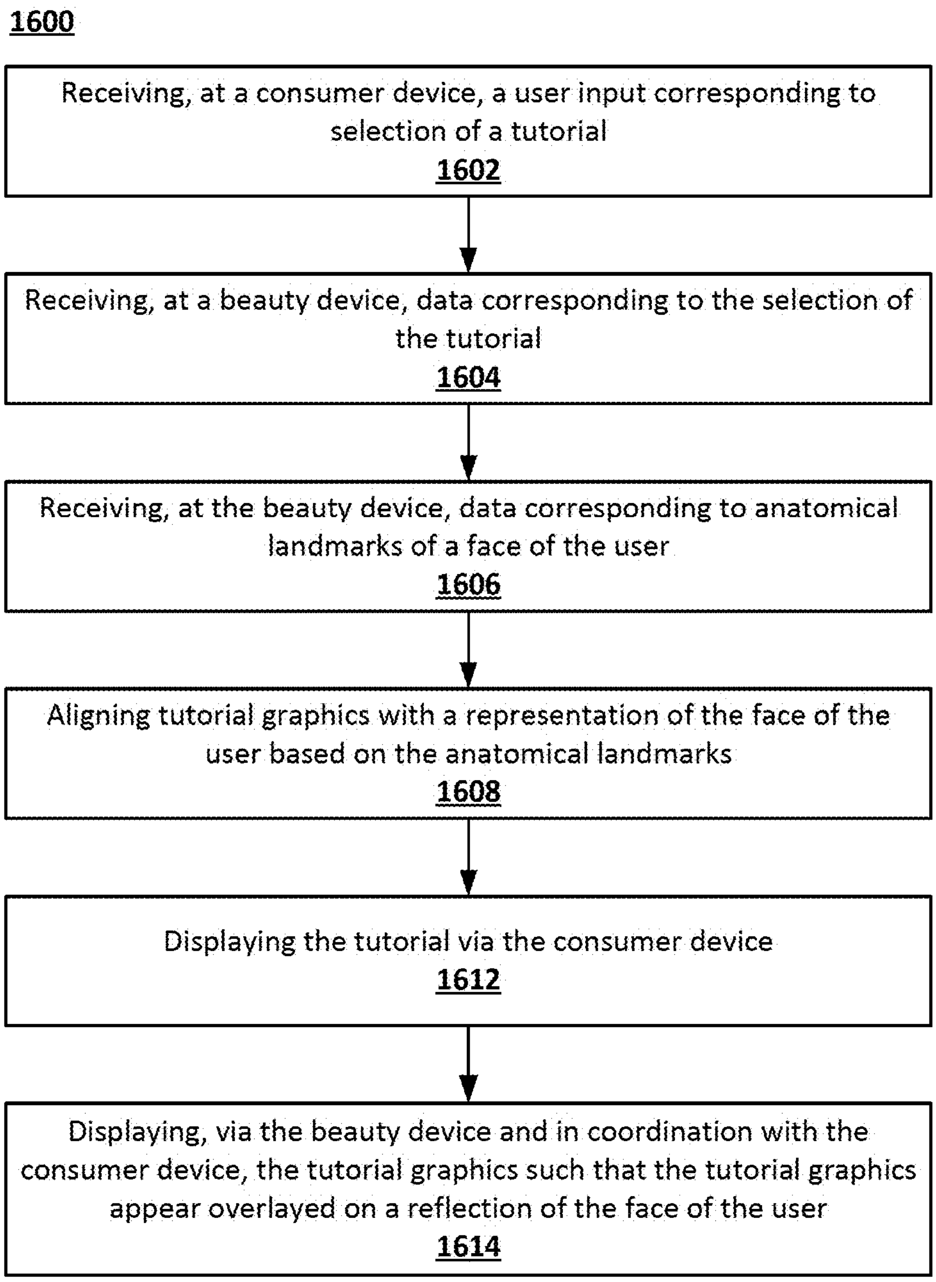
FIG. 15A is a flow chart diagram of an example method of providing a guided beauty tutorial to a user via a smart mirror system, in accordance with some embodiments.

FIG. 15A is a flow chart diagram of an example method 1600 of providing a beauty tutorial to a user, in accordance with some embodiments. The method 1600 can include receiving, at a consumer device, a user input associated with or corresponding to selection of a tutorial, at 1602. The user input can include selection of the tutorial through a beauty app executed on the consumer device (e.g., via interfaces of beauty apps 402, 1026, 1126, 1226). In some embodiments, the method 1600 can include receiving, at a beauty device (e.g., the smart vanity mirror 100, 200, 500, etc.), data associated with or corresponding to the selection of the tutorial, at 1604. In some embodiments, the method 1600 can include receiving, at the beauty device, data associated with or corresponding to anatomical landmarks (e.g., facial landmarks) of a face of the user, at 1606. The data associated with or corresponding to the anatomical landmarks can be collected by a camera of the beauty device and/or a camera of the consumer device. In some embodiments, the camera of the beauty device can be configured to collect images or video of the face of the user, and a processor onboard the beauty device can analyze the images or video to determine the anatomical landmarks. In some embodiments, the beauty device can include a processor configured to cause the camera to collect the images and/or analyze the images. In some embodiments, the data can be sent to the a remote compute device (e.g., remote compute device 130) or the consumer device (e.g., consumer device 120), and the data can be analyzed via processors of the remote compute device and/or the consumer device and stored in a memory of the remote compute device and/or the consumer device. In some embodiments, the beauty device can determine or detect anatomical landmarks of the user in real-time or near real-time. For example, the processor of the beauty device can be configured to execute facial recognition software such that the beauty device can detect the anatomical landmarks as the user uses the smart vanity mirror. Therefore, the beauty device can track movement of the anatomical landmarks as the user moves in front of the beauty device (e.g., the mirror). In some embodiments, the beauty device can receive data associated with features of the face of the user. For example, the camera of the consumer device can collect images of the face of the user and analyze the images to determine features of the face (e.g., face shape, skin complexion, etc.). The consumer device can determine features of the face of the user during setup of the app (e.g., as described in FIG. 8A-8C). In some embodiments, the data corresponding to the features of the face of the user can be received at the beauty device before or during initiation of the tutorial. In some embodiments, the guidance (e.g., the tutorial graphics) can be adjusted or modified based on at least one of the anatomical landmarks and/or the features of the face of the user. In some embodiments, the method 1600 can include aligning graphics associated with the tutorial (e.g., tutorial graphics) with a representation of the face of the user (e.g., the image of the face collected from the camera) based on the anatomical landmarks. The method 1600 can optionally include displaying, via the beauty device, confirmation the consumer device and the beauty device are paired, at 1610. In some embodiments, after the beauty device receives data from the consumer device associated with or corresponding to the tutorial, the beauty device can display confirmation that the consumer device and the beauty device are paired.

In some embodiments, the method 1600 can include displaying the tutorial via the consumer device, at 1612. In some embodiments, the beauty device can receive the data associated with or corresponding to the anatomical landmarks and/or can have the data associated with or corresponding to the anatomical landmarks stored in an onboard memory and can update, modify, and/or personalize the guidance of the tutorial (e.g., the graphic overlay) based on the anatomical landmarks. In some embodiments, the beauty device can detect the anatomical landmarks in real-time or near real-time. In some embodiments, the method 1600 can include displaying, via the beauty device and in coordination with the consumer device, the tutorial graphics such that the tutorial graphics appear overlaid on a reflection of the face of the user, at 1614. In some embodiments, the method can include displaying the tutorial graphics via an optical system such as those described with respect to FIGS. 1, 2, and/or 5. In some embodiments, the beauty device can be configured to display overlay graphics to indicate a region of the face to apply product to, a direction to apply the product, a tool to use to apply the product, etc. In some embodiments, the beauty device can be configured to modify the tutorial (e.g., the instructions given) in real time based on feedback information collected from one or more sensors on the beauty device (e.g., camera, microphone, etc.) that is associated with or corresponds to how the user is executing the tutorial.

Figure 15B:
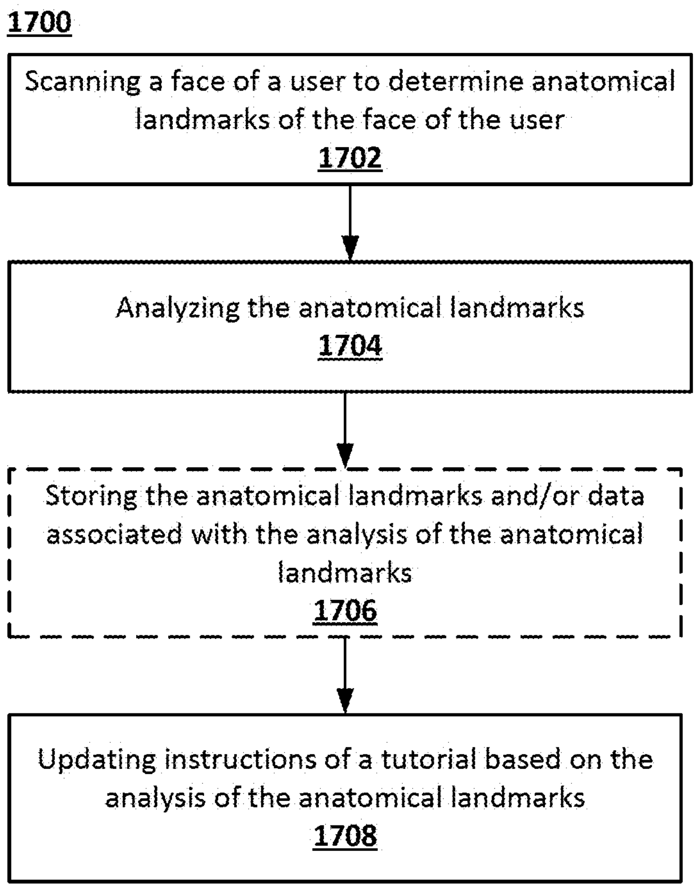
FIG. 15B a flow chart diagram of an example method of onboarding a user onto a guided beauty app, in accordance with some embodiments.

FIG. 15B a flow chart diagram of an example method 1700 of onboarding a user into a beauty app and/or preparing the user for a beauty tutorial, in accordance with some embodiments. In some embodiments, the method 1700 can include scanning a face of a user to determine facial features and/or anatomical landmarks of the face of the user, at 1702. In some embodiments, the scanning can be performed by a camera of a beauty device (e.g., a smart vanity mirror as described herein) or a camera of a consumer device. In some embodiments, the method 1700 can include analyzing the anatomical landmarks, at 1704. For example, a representation of the face of the user generated from scanning the face of the user can be analyzed based on the anatomical landmarks. In some embodiments, the analyzing the anatomical landmarks can include analyzing the anatomical landmarks to determine features of the face of the user. For example, the features of the face can include face shape, coordinates of the anatomical features, and/or spatial relationship between anatomical features of the user. In some embodiments, the anatomical landmarks can be analyzed by one or more algorithms to support personalization and recommendations. For example, relationships inferred from the landmarks (e.g., relationships between structures of the face) can be used to suggest techniques or products that may be well suited to a user's features, or to indicate when certain techniques may be less optimal for a given face shape or proportion.

In some embodiments, the analyzing the anatomical landmarks can include using the anatomical landmarks as reference points that are matched to corresponding landmarks associated with a model face (e.g., a face model of a creator, model, or tutorial reference). This landmark-to-landmark mapping can be used to place, scale, and orient tutorial graphics so that the guidance appears in the correct location on the user's face. Landmark-to-landmark mapping can occur during setup of the app and/or in real-time as the user completes the tutorial. In some embodiments, the analysis of the anatomical landmarks can be performed at the consumer device and/or at a processor of the smart vanity mirror.

In some embodiments, the method 1700 can optionally include storing the anatomical landmarks and/or the features of the face, at 1706. In some embodiments, a memory of the consumer device, a memory of a remote compute device (e.g., remote compute device 130), and/or a memory of the smart vanity mirror can store information associated with or corresponding to the anatomical landmarks and/or the features of the face of the user. In some embodiments, when a tutorial is initiated, the information associated with or corresponding to the anatomical landmarks and/or the features of the face can be retrieved and used to personalize the tutorial and/or align tutorial graphic overlays with a reflection of the phase produced by the beauty device (e.g., the smart vanity mirror). In some embodiments, the method 1700 can include detecting the anatomical landmarks and analyzing the anatomical landmarks in real-time during the tutorial (e.g., at the beauty device). For example, the landmark-to-landmark mapping can occur continuously or periodically as the user completes the tutorial. In some embodiments, the method 1700 can include updating the instructions of a tutorial (e.g., a makeup tutorial) based on the analysis of the anatomical landmarks (e.g., the landmark-to-landmark mapping and/or the features of the face of the user), at 1708. Therefore, the method 1700 can enable personalized makeup application and/or beauty routine instructions.

In some embodiments, an apparatus includes an enclosure, a processor, a display system, and a memory. The enclosure has at least one mirrored surface. The display system is operatively coupled to the processor. The memory is operatively coupled to the processor and stores processor-readable instructions that, when executed by the processor, cause the processor to cause display, via the display system and at a first time, of an overlay such that the overlay is visible to a user concurrently with the user viewing a reflection of the user in the mirrored surface. The memory also stores instructions to cause the processor to, at a second time subsequent to the first time, and in response to detecting a movement of the user, modify a position of the displayed overlay.

In some implementations, the memory also stores instructions to cause the processor to detect a representation of a face of the user and generate the overlay based on the representation of the face of the user. The memory can also store an artificial intelligence (AI) model and instructions to cause the processor to cause the AI model to generate at least one of a feedback message or an overlay notification based on the representation of the face of the user, and to cause display of the at least one of the feedback message or the overlay notification via the display system.

In some implementations, the display system includes at least one of a liquid crystal display (LCD) screen, a light-emitting diode (LED), an organic LED (OLED), a quantum dot LED (QLED), an active matrix organic LED (AMOLED), a mini-LED or a micro-LED, and the display system is disposed at least partially within the enclosure.

In some implementations, the display system further includes at least one lens and the memory further stores processor-readable instructions to cause the processor to cause a dynamic adjustment to an effective focal distance between the display system and an eye of the user.

In some implementations, the apparatus also stores processor-readable instructions to cause the processor to cause a dynamic adjustment to an effective focal distance between the display system and an eye of the user.

In some implementations, the apparatus also stores processor-readable instructions to cause the processor to cause a translation, along an optical axis of the apparatus, of a focal plane of the overlay.

In some implementations, the display system includes at least one of a liquid crystal (LC) tunable-focus lens, an electrically tunable liquid lens, an Alvarez lens, a LCP based lens array, a piezoelectric tunable lens, an electromechanical tunable lens, a varifocal lens, or a split-Lohmann optics system.

In some implementations, the display system is disposed at least partially within the enclosure and includes an autostereoscopic display having at least one of a light field display(s), volumetric display(s), holographic display(s), a spatial multiplex display(s), lenticular lens display(s), or parallax barrier display(s).

In some implementations, the display system includes a projector.

In some implementations, the memory also stores instructions to cause the processor to detect a representation of a face of the user, identify (e.g., generate) a tutorial based on the detected representation of the face of the user, and identify (e.g., generate) the overlay based on the tutorial. The overlay can be a first overlay from a plurality of overlays, and the memory can further store instructions to cause the processor to identify, using an AI model, a plurality of makeup tutorial segments. The first overlay can be associated with a first makeup tutorial segment from the plurality of makeup tutorial segments. The memory can also store instructions to cause the processor to cause display, via the display system and at a third time subsequent to the second time, of a second overlay from the plurality of overlays, the second overlay associated with a second makeup tutorial segment from the plurality of makeup tutorial segments.

In some embodiments, a non-transitory, processor-readable medium stores instructions that, when executed by a processor, cause the processor to cause display, via a smart vanity mirror and at a first time, of an overlay such that the overlay is visible to a user concurrently with the user viewing a reflection of the user in a reflective surface of the smart vanity mirror. The medium can also store instructions to cause, at a second time subsequent to the first time, and in response to detecting a movement of the user, the displayed overlay to be repositioned within a display of the smart vanity mirror.

In some embodiments, an apparatus includes a glass surface, a reflective coating at least partially covering the glass surface, a processor, a heads up display (HUD) system operatively coupled to the processor, and a memory. The memory is operatively coupled to the processor and the HUD, and stores processor-readable instructions that, when executed by the processor, cause the processor to cause the HUD system to display an overlay on the glass surface such that the overlay and a reflection in the reflective coating are concurrently visible.

In some embodiments, an apparatus includes a display configured to emit light along an optical path, a lens disposed along the optical path, a first optical element configured to reflect the light emitted by the display at a non-zero angle and towards a user, and a second mirror including a first surface configured to face the user and a second surface facing the first optical element. The first surface is a reflective surface such that the user can view a reflection of a face of the user in the second mirror, and the second mirror is configured to allow light reflected by the first optical element to transmit through the second mirror such that a graphic appears overlaid on the reflection of the face of the user, the graphic associated with a beauty tutorial instruction.

In some implementations, the apparatus also includes a processor operatively coupled to the display, and a memory operatively coupled to the processor and storing processor-readable instructions that, when executed by the processor, cause the processor to cause the display to emit light in a pattern that is based on the graphic associated with the beauty tutorial instruction.

In some implementations, the apparatus also includes a processor operatively coupled to the display, and a memory operatively coupled to the processor and storing processor-readable instructions that, when executed by the processor, cause the processor to dynamically adjust (e.g., via the lens) an effective focal distance between the display and the eye of the user.

In some implementations, the apparatus also includes a processor operatively coupled to the display, and a memory operatively coupled to the processor and storing processor-readable instructions that, when executed by the processor, cause the processor to detect a representation of a face of the user, generate or modify a beauty tutorial based on the detected representation of the face of the user, and generate the graphic based on the tutorial. The representation of the face of the user can include an indication of a location of one or more anatomical landmarks of the face of the user.

In some implementations, the apparatus also includes a processor operatively coupled to the display, and a memory operatively coupled to the processor and storing processor-readable instructions that, when executed by the processor, cause the processor to cause, at a first time, the display to emit light in a first pattern associated with the graphic, and to cause, at a second time subsequent to the first time and in response to detecting a movement of the user, the display to emit light in a second pattern having at least one of a modified position or a modified size relative to the first pattern.

In some implementations, the memory also stores instructions to cause the processor to cause display of one or more graphics via a mobile software application executing on a user device, concurrently with at least one of causing the display to emit light in the first pattern or causing the display to emit light in the second pattern.

In some embodiments, an apparatus includes an optical component including a mirrored surface, a processor, a display system operatively coupled to the processor, and a memory operatively coupled to the processor and storing processor-readable instructions that, when executed by the processor, cause the processor to (1) receive, from a mobile device of a user, data representing a user selection of a tutorial, and data associated with anatomical landmarks of a face of a user, (2) align a tutorial graphic associated with the tutorial with a representation of the face of the user based on the anatomical landmarks of the face of the user, and (3) cause display, via the display system, of the aligned tutorial graphic such that the aligned tutorial graphic appears overlaid on a reflection of the user generated by the mirrored surface.

In some implementations, the instructions to cause display of the aligned tutorial graphic include instructions to cause the display of the aligned tutorial graphic at a first time and at a first location of the mirrored surface, the memory further storing instructions to cause the processor to cause display, at a second time subsequent to the first time, and in response to detecting a movement of the user, of the aligned tutorial at a second location of the mirrored surface different from the first location.

In some implementations, the optical component is partially transmissive such that light emitted by the display system transmits through the optical component.

In some implementations, the optical component comprises a first optical component including a mirrored surface. The apparatus further includes a lens and a second optical component comprising a mirror configured to reflect light emitted by the display system at a non-zero angle toward the first optical component, such that the light is transmitted through the first optical component and viewable by the user.

In some implementations, the memory also stores processor-readable instructions to cause the processor to cause a dynamic adjustment to an effective focal distance between the display system and an eye of the user.

In some embodiments, an apparatus includes a display, a first optical element, a second optical element, and a mirror. The display is configured to emit light along an optical path. The first optical element is disposed along the optical path. The second optical element is configured to reflect or redirect the light emitted by the display at a non-zero angle. The mirror includes a first surface configured to face the user and a second surface facing the second optical element. The mirror is configured to allow light redirected by the second optical element to transmit through the mirror such that a graphic appears overlaid on a reflection of the face of the user generated by the first surface of the mirror, the graphic associated with instructive guidance.

In some implementations, the apparatus also includes a processor and a memory. The processor is operatively coupled to the display, and the memory is operatively coupled to the processor and storing processor-readable instructions that, when executed by the processor, cause the processor to cause the display to emit light in a pattern that is based on the graphic associated with instructive guidance.

In some implementations, the apparatus also includes a processor and a memory. The processor is operatively coupled to the display, and the memory is operatively coupled to the processor and storing processor-readable instructions that, when executed by the processor, cause the processor to dynamically adjust an effective focal distance (or an apparent image distance or focal plane) of displayed content as perceived by an eye of the user.

In some implementations, the apparatus also includes a processor and a memory. The processor is operatively coupled to the display, and the memory is operatively coupled to the processor and storing processor-readable instructions that, when executed by the processor, cause the processor to detect a representation of a face of the user, generate or modify guidance based on the detected representation of the face of the user, and generate the graphic based on the guidance.

The representation of the face of the user can include an indication of a location of one or more anatomical landmarks of the face of the user.

In some implementations, the apparatus also includes a processor and a memory. The processor is operatively coupled to the display, and the memory is operatively coupled to the processor and storing processor-readable instructions that, when executed by the processor, cause the processor to cause, at a first time, the display to emit light in a first pattern associated with the graphic, and to cause, at a second time subsequent to the first time and in response to detecting a movement of the user, the display to emit light in a second pattern having at least one of a modified position or a modified size relative to the first pattern.

The memory can also store instructions to cause the processor to cause display of one or more graphics via a mobile software application executing on a user device, concurrently with at least one of causing the display to emit light in the first pattern or causing the display to emit light in the second pattern.

In some implementations, the instructive guidance can be or include instructive guidance for a beauty tutorial.

In some implementations, the first optical component includes a lens.

In some implementations, the second optical component includes at least one of a mirror or a beam splitter.

In some embodiments, an apparatus includes an optical component, a processor, a display system, and a memory. The optical component is configured to generate a reflection of a user. The display system is operatively coupled to the processor. The memory is operatively coupled to the processor and stores processor-readable instructions that, when executed by the processor, cause the processor to receive, from a mobile device of a user, data representing a user selection of a tutorial, generate data associated with anatomical landmarks of a face of the user, align a tutorial graphic associated with the tutorial with a representation of the face of the user based on the anatomical landmarks of the face of the user, and cause display, via the display system, of the aligned tutorial graphic such that the aligned tutorial graphic appears overlaid on the reflection of the user generated by the optical component.

In some implementations, the instructions to cause display of the aligned tutorial graphic include instructions to cause the display of the aligned tutorial graphic at a first time and at a first location of the optical component, the memory further storing instructions to cause the processor to cause display, at a second time subsequent to the first time, and in response to detecting a movement of the user, of the aligned tutorial at a second location of the optical component different from the first location.

In some implementations, the optical component is partially transmissive such that light emitted by the display system transmits through the optical component.

In some implementations, the optical component is a first optical component, and the apparatus also includes a second optical component and a third optical component. The second optical component is disposed along an optical path between the display and the first optical component, and the third optical component is disposed along the optical path and configured to reflect light emitted by the display system at a non-zero angle towards the first optical component, such that the reflected light is viewable by the user.

In some implementations, the memory also stores processor-readable instructions to cause the processor to cause a dynamic adjustment to an effective focal distance between the display system and an eye of the user.

In some implementations, the apparatus also includes a housing that houses the optical component, the processor, the display, and the memory.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The phrase "based on" does not mean "based only on," unless expressly specified otherwise. In other words, the phrase "based on" describes both "based only on" and "based at least on."

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus, comprising:

an enclosure;

a processor;

a display system at least partially disposed in the enclosure and operatively coupled to the processor, the display system including:

a display configured to emit light along an optical path, a mirror configured to generate a reflection of a user and to transmit at least a portion of the light displayed by the display to an eye of the user, and an optical element disposed along the optical path between the display and the mirror; and a memory operatively coupled to the processor and storing processor-readable instructions that, when executed by the processor, cause the processor to:

cause display, via the display system and at a first time, of an overlay such that the overlay is visible to the user concurrently with the user viewing the reflection of the user, at a second time subsequent to the first time, and in response to detecting a movement of the user, modify a position of the overlay; and cause, during at least one of the first time or the second time, the optical element to dynamically adjust the focal plane of the overlay such that the overlay and the reflection of the user appear at a substantially common focal distance from the eye of the user.

2. The apparatus of claim 1, wherein the memory further stores instructions to cause the processor to detect a representation of a face of the user and generate the overlay based on the representation of the face of the user.

3. The apparatus of claim 2, wherein the memory further stores an artificial intelligence (AI) model and instructions to cause the processor to:

cause the AI model to generate at least one of a feedback message or an overlay notification based on the representation of the face of the user; and cause display of the at least one of the feedback message or the overlay notification via the display system.

4. The apparatus of claim 1, wherein the display system includes at least one of a liquid crystal display (LCD) screen, a light-emitting diode (LED), an organic LED (OLED), a quantum dot LED (QLED), an active matrix organic LED (AMOLED), a mini-LED or a micro-LED.

5. The apparatus of claim 1, wherein the optical element includes at least one lens.

6. The apparatus of claim 1, wherein the memory further stores processor-readable instructions to cause the processor to:

cause a translation, along an optical axis of the mirror, of the focal plane of the overlay.

7. The apparatus of claim 1, wherein the display system includes at least one of a liquid crystal (LC) tunable-focus lens, an electrically tunable liquid lens, an Alvarez lens, a LCP based lens array, a piezoelectric tunable lens, an electromechanical tunable lens, a varifocal lens, or a split-Lohmann optics system.

8. The apparatus of claim 1, wherein the display system is disposed at least partially within the enclosure and includes an autostereoscopic display having at least one of a light field display(s), volumetric display(s), holographic display(s), a spatial multiplex display(s), lenticular lens display(s), or parallax barrier display(s).

9. The apparatus of claim 1, wherein the display system includes a projector.

10. The apparatus of claim 1, wherein the memory further stores instructions to cause the processor to:

detect a representation of a face of the user;

identify a tutorial associated with the detected representation of the face of the user; and identify the overlay based on the tutorial.

11. The apparatus of claim 10, wherein the overlay is a first overlay from a plurality of overlays and the memory further stores instructions to cause the processor to:

identify a plurality of makeup tutorial segments, the first overlay associated with a first makeup tutorial segment from the plurality of makeup tutorial segments; and cause display, via the display system and at a third time subsequent to the second time, of a second overlay from the plurality of overlays, the second overlay associated with a second makeup tutorial segment from the plurality of makeup tutorial segments.

12. The apparatus of claim 1, wherein the mirror is a concave magnifying mirror, and the optical element is configured to compensate for a curvature of the concave magnifying mirror and a viewing distance of the user from the mirror when dynamically adjusting the focal plane of the overlay.

13. The apparatus of claim 1, wherein the memory further stores processor-readable instructions to cause the processor to:

determine a viewing distance between the user and the mirror and cause the optical element to adjust the focal plane of the overlay based at least in part on the viewing distance.

14. The apparatus of claim 1, further comprising:

one or more sensors configured to collect sensor data including at least one of a position of the user or a three-dimensional representation of the face of the user, the processor-readable instructions cause the processor to adjust the display of the overlay based at least in part on the sensor data.

15. An apparatus, comprising:

a display configured to emit light along an optical path;

a first optical element disposed along the optical path and between the display and a mirror; and a second optical element disposed along the optical path and configured to reflect or redirect the light emitted by the display at a non-zero angle, the mirror, including a first surface configured to face a user and a second surface facing the second optical element, the mirror configured to allow light redirected by the second optical element to transmit through the mirror such that a graphic appears overlaid on a reflection of a face of the user generated by the first surface of the mirror, the graphic associated with instructive guidance, the first optical element configured to dynamically adjust a focal plane of the graphic such that the graphic and the reflection of the face of the user appear at a substantially common focal distance from an eye of the user.

16. The apparatus of claim 15, further comprising:

a processor operatively coupled to the display; and a memory operatively coupled to the processor and storing processor-readable instructions that, when executed by the processor, cause the processor to:

cause the display to emit light in a pattern that is based on the graphic associated with instructive guidance.

17. The apparatus of claim 15, further comprising:

a processor operatively coupled to the display; and a memory operatively coupled to the processor and storing processor-readable instructions that, when executed by the processor, cause the processor to:

detect a representation of the face of the user;

generate or modify guidance based on the detected representation of the face of the user; and generate the graphic based on the guidance.

18. The apparatus of claim 17, wherein the representation of the face of the user includes an indication of a location of one or more anatomical landmarks of the face of the user.

19. The apparatus of claim 15, further comprising:

a processor operatively coupled to the display; and a memory operatively coupled to the processor and storing processor-readable instructions that, when executed by the processor, cause the processor to:

cause, at a first time, the display to emit light in a first pattern associated with the graphic, and cause, at a second time subsequent to the first time and in response to detecting a movement of the user, the display to emit light in a second pattern having at least one of a modified position or a modified size relative to the first pattern.

20. The apparatus of claim 19, wherein the memory further stores instructions to cause the processor to:

cause display of one or more graphics via a mobile software application executing on a user device, concurrently with at least one of causing the display to emit light in the first pattern or causing the display to emit light in the second pattern.

21. The apparatus of claim 15, wherein the instructive guidance is instructive guidance for a beauty tutorial.

22. The apparatus of claim 15, wherein the first optical element includes a lens.

23. The apparatus of claim 15, wherein the second optical element includes at least one of a mirror or a beam splitter.

24. The apparatus of claim 15, wherein the second optical element redirects light at the non-zero angle such that a length of an optical path between the display and the mirror is greater than a physical distance between the display and the mirror.

25. An apparatus, comprising:

a display system including:

a display configured to emit light along an optical path, a mirror configured to generate a reflection of a user and to transmit at least a portion of the light displayed by the display to an eye of the user, and an optical element disposed along the optical path between the display and the mirror;

a processor operatively coupled to the display system; and a memory operatively coupled to the processor and storing processor-readable instructions that, when executed by the processor, cause the processor to:

receive, from a mobile device of a user, data representing a user selection of a tutorial, generate data associated with anatomical landmarks of a face of the user;

align a tutorial graphic associated with the tutorial with a representation of the face of the user based on the anatomical landmarks of the face of the user;

cause display, via the display system, of the aligned tutorial graphic such that the aligned tutorial graphic appears overlaid on the reflection of the user generated by the mirror, and cause the optical element to dynamically adjust a focal plane of the aligned tutorial graphic such that the aligned tutorial graphic and the reflection of the user appear at a substantially common focal distance from the eye of the user.

26. The apparatus of claim 25, wherein the instructions to cause display of the aligned tutorial graphic include instructions to cause the display of the aligned tutorial graphic at a first time and at a first location, the memory further storing instructions to cause the processor to cause display, at a second time subsequent to the first time, and in response to detecting a movement of the user, of the aligned tutorial graphic at a second location different from the first location.

27. The apparatus of claim 25, wherein the optical element is a first optical element, the apparatus further comprising:

a second optical element disposed along the optical path and configured to reflect light emitted by the display system at a non-zero angle towards the mirror such that the reflected light is viewable by the user.

28. The apparatus of claim 25, further comprising:

a housing that houses the mirror, the processor, the display, and the memory.

* * * * *